US012243382B2

(12) United States Patent
Sepich et al.

(10) Patent No.: US 12,243,382 B2
(45) **Date of Patent: *Mar. 4, 2025**

(54) SYSTEM, METHOD, AND PROGRAM USING NEAR FIELD COMMUNICATION FOR GAMING MACHINE

(71) Applicant: Konami Gaming, LLC, Las Vegas, NV (US)

(72) Inventors: Edward Sepich, Henderson, NV (US); Thomas E. Soukup, Las Vegas, NV (US); Jeffrey George, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,125

(22) Filed: Nov. 4, 2022

(65) Prior Publication Data

US 2023/0177915 A1 Jun. 8, 2023

Related U.S. Application Data

(63) Continuation of application No. 16/788,663, filed on Feb. 12, 2020, now Pat. No. 11,521,457, which is a continuation of application No. 16/143,227, filed on Sep. 26, 2018, now Pat. No. 10,600,281.

(60) Provisional application No. 62/564,141, filed on Sep. 27, 2017.

(51) Int. Cl.
*G07F 17/32* (2006.01)

(52) U.S. Cl.
CPC ...... *G07F 17/3227* (2013.01); *G07F 17/3244* (2013.01)

(58) Field of Classification Search
None
See application file for complete search history.

(56) References Cited

U.S. PATENT DOCUMENTS

| | | | | |
|---|---|---|---|---|
| 9,071,287 | B2 * | 6/2015 | Siddiqui | H04B 5/77 |
| 9,153,095 | B2 | 10/2015 | Adiraju et al. | |
| 10,600,281 | B2 | 3/2020 | Sepich et al. | |
| 2008/0220878 | A1 | 9/2008 | Michaelis | |
| 2010/0124993 | A1 | 5/2010 | Acres | |
| 2013/0337890 | A1 | 12/2013 | Earley et al. | |
| 2014/0274306 | A1 | 9/2014 | Crawford et al. | |
| 2015/0065044 | A1 * | 3/2015 | Dua | G06F 3/0484 455/41.1 |
| 2015/0087405 | A1 | 3/2015 | George et al. | |
| 2016/0027244 | A1 * | 1/2016 | Adiraju | G07F 17/3241 463/25 |
| 2019/0164384 | A1 | 5/2019 | Soukup et al. | |

(Continued)

*Primary Examiner* — Ronald Laneau
(74) *Attorney, Agent, or Firm* — Howard & Howard Attorneys PLLC

(57) ABSTRACT

A networked computer system for use in a casino property is described herein. The networked computer system includes a near field communication (NFC) reader coupled to a gaming device and a player tracking server. The player tracking server is programmed to receive an NFC signal including a user ID, access a plurality of user account records and select a matching user account record having a corresponding user ID matching the received user ID, retrieve account information included in the matching user account record, and display the account information on the gaming device.

20 Claims, 21 Drawing Sheets

(56) References Cited

U.S. PATENT DOCUMENTS

| | | | | |
|---|---|---|---|---|
| 2019/0340871 | A1* | 11/2019 | Miri | G07F 17/323 |
| 2020/0184769 | A1 | 6/2020 | Sepich et al. | |
| 2020/0410813 | A1* | 12/2020 | Petersen | G07F 17/3211 |

* cited by examiner

106

| | 222 | | | 196/242 | 226 | 224 | 228 |
|---|---|---|---|---|---|---|---|
| | Player Account | Patron Name | Birthdate | Player Tracking ID (Employee Tracking ID) | PIN | NFC ID | Priority Level |
| 220 | 10001313 | John Smith | 12/16/1965 | 1234567 | 2056 | 123321 | 1 |
| 220 | 12001321 | Jane Doe | 01/12/1974 | 7654321 | 8956 | 456654 | 1 |
| | 10001365 | Mary Doe | 07/29/1975 | 8521479 | 1234 | 789987 | 2 |

FIG. 11

106

| | 234 | 198 | 238 | 236 | 240 |
|---|---|---|---|---|---|
| | Player Account | Temporary Player Tracking ID | PIN | NFC ID | Priority Level |
| 232 | 8596589 | 7896529 | 1256 | 741147 | 1 |
| 232 | 2594511 | 7854911 | 5695 | 852258 | 1 |
| | 2562668 | 8599665 | 8596 | 963369 | 1 |

FIG. 12

230

| | |
|---|---|
| 222 Player Acc. #: | 10001313 |
| 196 Player Tracking ID: | 1234567 |
| Address: | 1234 Main Street, Anytown |
| Postal Code: | 10234 |

244

| Session ID | Date | Start | End | Game Type | Total Wagered Amount |
|---|---|---|---|---|---|
| Session001 | 01/16/2016 | 20:32 | 22:05 | Slot | $232.00 |
| Session002 | 01/16/2016 | 22:15 | 23:02 | Slot | $105.00 |

FIG. 13

230

| | |
|---|---|
| 234 Temporary Player Acc. #: | 8596589 |
| 198 Temporary Player Tracking ID: | 7896529 |
| Address: | N/A |
| Postal Code: | N/A |

244

| Session ID | Date | Start | End | Game Type | Total Wagered Amount |
|---|---|---|---|---|---|
| Session005 | 01/25/2016 | 21:52 | 23:35 | Table | $985.00 |
| Session006 | 02/16/2016 | 11:10 | 16:52 | Slot | $501.00 |

FIG. 14

246

250 252 254

248

| Action Record ID | Triggering Event | Action Event Data | Action Event |
|---|---|---|---|
| Action001 | Receive existing player tracking ID | Receive existing player tracking ID and need the corresponding PIN | Request PIN |
| Action002 | Receive correct corresponding PIN | If correct PIN is received light the NFC reader Green | Light up NFC Reader Green |
| Action003 | NFC Reader has a Green Light | Find the corresponding player account | Receive Corresponding Player Account |
| Action004 | Receive a second player tracking ID while the first player ID is using EGM | Determine the priority level of the first and second player tracking ID's | Receive corresponding priority level of the first and second player tracking ID's |
| Action005 | The second player tracking ID is associated with a higher priority level than the first player tracking ID | Allow second player tracking ID access to the EGM while the first player is using the EGM | Allow second player access to EGM |
| Action006 | NFC component is within the predetermined proximity to the NFC reader | Determine the NFC ID associated with the NFC component | Receive NFC ID |
| Action007 | Determine whether the NFC ID received is associated with a player tracking account | Receive the player tracking ID associated with the NFC ID | Received the player tracking ID |
| Action008 | Receive a new NFC ID within the predetermined proximity to the NFC reader | Create a new temporary player tracking account to be associated with the new NFC ID | Create temporary player tracking account |
| Action009 | Receive a log-in from a temporary player account to be verified | Merge the temporary player tracking account to a player tracking account | Merge player tracking accounts |
| Action010 | Receive incorrect corresponding PIN | If incorrect PIN is received light the NFC reader red | Light the NFC reader red |
| Action011 | Do not receive any NFC components within a predetermined proximity | If a NFC component is not present in the predetermined proximity, light the NFC reader blue | Light the NFC reader blue |

FIG. 15

256

| Player Tracking ID (196/198) | Action Record ID (248) | Event Trigger (250) | Action Rule File (252) | Rule Description (252) | Notification Message File (252) | Action Event (254) |
|---|---|---|---|---|---|---|
| 258 1234567 | Action01 | Receive existing player tracking ID | Action01.API | Receive existing player tracking ID and need the corresponding PIN | InfoMessage01 | Request corresponding PIN |
| 258 1234567 | Action02 | Receive correct corresponding PIN | Action02.API | If correct PIN is received light the NFC reader Green | InfoMessage02 | Make NFC Reader Green |
| 1234567 | Action03 | NFC Reader has a Green Light | Action03.API | Find the corresponding player account | InfoMessage03 | Send the corresponding player account information to the player tracking device |
| 7894561 | Action04 | Receive existing player tracking ID while patron is using EGM | Action04.API | Allow player tracking ID access to the EGM while a player is using the EGM if the second player ID has a higher priority | InfoMessage04 | Allow the second player tracking ID access to the EGM |

FIG. 16

SYSTEM, METHOD, AND PROGRAM USING NEAR FIELD COMMUNICATION FOR GAMING MACHINE

CROSS-REFERENCE TO RELATED APPLICATION

This application is a continuation of U.S. patent application Ser. No. 16/788,663, filed Feb. 12, 2022, which is a continuation of U.S. patent application Ser. No. 16/143,227, filed Sep. 26, 2018 (now U.S. Pat. No. 10,600,281, issued Mar. 24, 2020), which claims the benefit of U.S. Provisional Patent Application Ser. No. 62/564,141, filed on Sep. 27, 2017, which are hereby incorporated by reference in their entirety for all purposes.

FIELD OF THE INVENTION

The present invention relates generally to casino management systems, and more particularly, to a casino management system which uses near field communication enabled devices to track the gaming activities of patrons, store data related thereto, and establish new patron accounts.

BACKGROUND OF THE INVENTION

The growth and competition in the casino gaming market in recent years and the increasingly sophisticated and complex technology being integrated into the gaming environment, presents both challenges and opportunities to gaming establishment operators. Over recent years, casino revenue has dramatically increased in the area of non-gaming revenue sources such as, hotel and hospitality, retail, dining, entertainment and other casino products or services. Traditionally, patron tracking systems have focused on tracking patrons of electronic gaming machines, table games and other gaming revenue areas such as, bingo and keno. In this traditional scenario, a patron is identified during gaming play by a patron tracking ID card and/or a patron identification number (PIN). The patron tracking system tracks the patron's gaming play and may award patron tracking points, bonuses, and other incentives according to established criteria to promote continued patron loyalty. Known casino management systems include player tracking devices that are connected to gaming machines. The player tracking devices require players to insert player identification cards that include player account numbers encoded on magnetic strips. The player tracking devices include magnetic strip card readers that read the encoded player account number from the magnetic strip to allow the player to access the corresponding player tracking account.

At least some known magnetic strip card readers may be vulnerable to security risks that include tampering using a card skimming device that is placed over the magnetic strip card reader and is used to record the information encoded in the magnetic strip of the player identification card. Because these card skimming devices are placed over existing magnetic strip card readers, a player may unknowingly insert the player card through the skimming device when attempting to insert the player card into the magnetic strip card readers of the gaming machine, thus allowing the skimming device to record the player account number associated with the player's player tracking account. The persons intent on stealing personal information about the player may then remove the skimming device, obtain the player account numbers recorded by the card skimming device, and access player tracking accounts using the stolen player account numbers.

In addition, some players do not wish to carry around a player tracking card while the player is in the casino environment.

Accordingly, systems are needed to improve the data security of existing casino management systems.

The present invention is aimed at one or more of the problem as set forth above.

SUMMARY OF THE INVENTION

In different embodiments of the present invention, systems and methods for operating an entertaining management and monitoring system including a player tracking system, are provided.

In one embodiment, a networked computer system, comprising: a plurality of gaming machines and a server computer system. Each gaming machine includes a player tracking device including a near filed communication (NFC) device configured to receive NFC signals associated with unique NFC IDs. The server computer system is coupled to each of the plurality of gaming machines. The server computer includes a database server computer and an application server computer. The database server computer includes a database server processor coupled to a database memory device. The database server processor is programmed to generate and store a program file including a plurality of player account records. Each player account record includes a unique player ID, player tracking information, and a unique NFC ID associated with a NFC component. The application server computer is coupled to the database server computer and to the plurality of gaming machines. The application server computer includes an application processor that is programmed to receive a first NFC ID from the player tracking device; access the plurality of player account records and select a player account record having an NFC ID matching the received first NFC ID; retrieve the player tracking information included in the selected player account record; display the retrieved player tracking information on the corresponding player tracking device and allow the player to modify player tracking information using the player tracking device; monitor gaming activity associated with the corresponding gaming machines; and modify the selected player account record to include information associated with the monitored gaming activity.

In another embodiment, a non-transitory computer-readable storage media, having computer-executable instructions embodied thereon. When executed by a processor, the computer-executable instructions cause the processor to generate and store a program file including a plurality of player account records in a database memory device. Each player account record includes a unique player ID, player tracking information, and a unique NFC ID associated with a NFC component. The processor is further caused to receive a first NFC ID from a gaming machine. Each gaming machine includes a player tracking device including a near field communication (NFC) device configured to receive NFC signals associated with unique NFC IDs. The processor accesses the plurality of player account records and selects a player account record having an NFC ID matching the received first NFC ID; retrieves the player tracking information included in the selected player account record; displays the retrieved player tracking information on the corresponding player tracking device and allows the player to modify player tracking information using the player tracking device; monitors gaming activity associated with the corresponding gaming machine; and modifies the selected player account record to include information associated with the monitored gaming activity.

In yet another embodiment, a method for operating a networked computer system includes an application server coupled to a plurality of gaming machines. Each gaming machine includes a player tracking device including an NFC enabled device. The method is configured to generate and store, by a database computer system, a program file including a plurality of player account records. Each player account record includes a unique player ID, player tracking information, and a unique NFC ID associated with a NFC component. The method is further configured to receive, by the application server computer, a first NFC ID from the player tracking device; access, by the application server computer, the plurality of player account records and select a player account record having an NFC ID matching the received first NFC ID; retrieve, by the application server computer, the player tracking information included in the selected player account record; display, by the application server computer, the retrieved player tracking information on the corresponding player tracking device and allow the player to modify player tracking information using the player tracking device; monitor, by the application server computer, gaming activity associated with the corresponding gaming machines; and modify, by the application server computer, the selected player account record to include information associated with the monitored gaming activity.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 11-16 are illustrations of exemplary database records generated by the system shown in FIG. 1, according to embodiments of the present invention;

Corresponding reference characters indicate corresponding parts throughout the drawings.

DETAILED DESCRIPTION OF INVENTION

Figure 1:
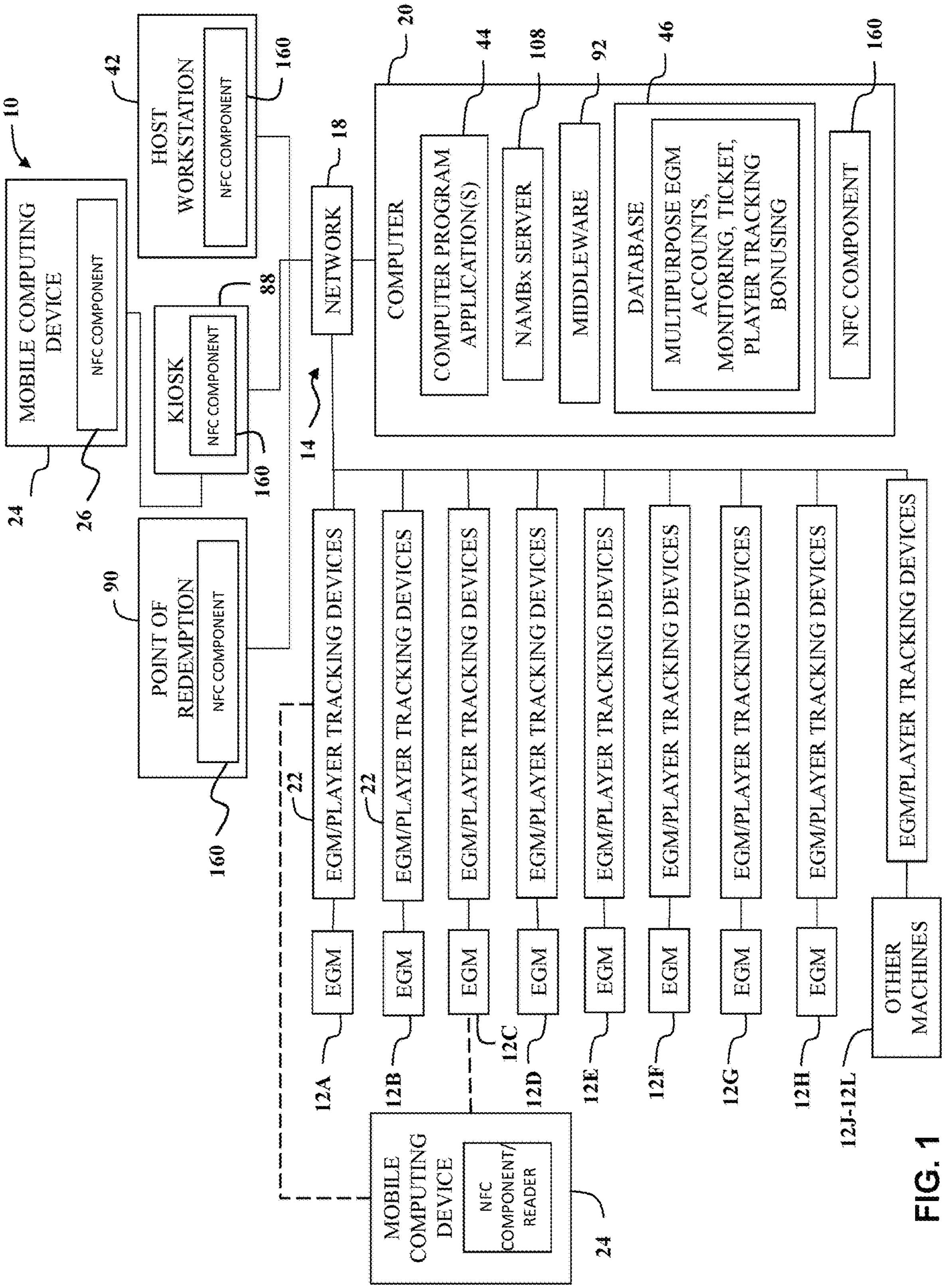
FIG. 1 is a schematic representation of an exemplary networked computer system for providing gaming property services to players via a gaming device, according to an embodiment of the present invention.

With reference to the drawings, and in operation, the present invention improves the function of known casino management systems by providing a system 10 that allows patrons to access player tracking account information using information transmitted wirelessly using near field communication (NFC) devices. In one embodiment, the system 10 includes a player gaming tracking device that is coupled to an electronic gaming machine (EGM). The player gaming tracking device includes an NFC enabled device that receives and transmits data wirelessly to and/or from an NFC enabled device associated with a patron. For example, in one embodiment, the NFC enabled device of the player gaming tracking device may communicate wirelessly with a NFC enabled smartphone associated with the patron. The patron may wirelessly transmit information to the player gaming tracking device using the NFC enabled devices to access player tracking services provided by the system's player tracking servers. In addition, the system 10 may also include kiosks including NFC enabled devices that allow patron's and/or casino operator employee's to access player account services using mobile computing devices having NFC tags. The system 10 may implement the NFC enabled device at a plurality of locations. The plurality of locations may include but are not limited to, a casino environment, a walkway, an entrance, a player club, a host stand, a VIP lounge, an EGM, and/or a gaming table seat. The gaming table may be interchangeable with the gaming machine. In addition, the NFC enabled device associated with a patron broadcasts a signal that includes an NFC ID that may be associated with a current player account. The NFC enabled device associated with a patron may include but is not limited to a mobile device including a communication device programmed to broadcast a NFC signal, a mobile device with a NFC tag attached to the outside of the device, a physical card having an NFC tag embedded within the physical car, and a physical card with a NFC tag attached to the outside of the card, and/or any other form of NFC enabled device capable of broadcasting a NFC signal and/or communicating with an NFC enabled device.

Other gaming establishment operators do not integrate near field communication devices into their systems for allowing users to log in and out of the gaming operators. In addition, other gaming operators do not allow for multiple users/players to be logged into a gaming system at the same time via near field communication. The use of near field communication in logging players into player tracking accounts will be more convenient and stream-line the logging in process for the players. Further, smaller gaming establishments may not want to print or use player tracking cards and implementing near field communication to log players in and out of gaming machines may benefit the smaller gaming establishments in tracking the player activity. For security, the player identification number (PIN) is used as a secondary security measure. By using both near field communication on a player's phone and the PIN, the player now has a secondary form of security for logging into the player tracking account.

In various embodiments, the system 10 may be able to detect the occupancy of patrons within a casino environment, such as, for example, patrons at gaming machines, gaming tables, kiosks, and/or any other casino establishment area. The system 10 may determine when the patron is within a predetermined proximity to the gaming machine using the NFC enabled devices. For example, the patron may move within the predetermined proximity to the gaming machine where the NFC enabled device may receive the NFC signal's broadcast from the player's mobile device. In addition, the system 10 may use the NFC tag to allow patrons to log-in to current player tracking accounts and to create temporary player tracking accounts. In addition, the system 10 may receive NFC signals from multiple NFC enabled devices. For example, the NFC component of mobile phones broadcast NFC signals including NFC ID's to the player tracking device; a player card may include embedded NFC tags that broadcast NFC signals to the player tracking devices; and NFC tags may be attached to existing player cards or iPhones™, for example, that broadcast NFC ID signals when the NFC tag is within the predetermined proximity to the player tracking device.

The system 10 is configured to monitor patron wagering activity of both current patrons and temporary patrons at a casino. Once the system receives the NFC ID broadcast from a NFC enabled device associated with the patron, the system 10 may determine whether the NFC ID is associated with a current player account and track the gaming activity played on the gaming machine. If the system 10 determines the received NFC ID is not associated with a current player account, the system 10 may create a temporary player account and track the gaming activity played on the gaming machine. In another embodiment, the system 10 is configured to request from the player whether they want to sign-up as a temporary member. The system 10 may create a temporary player account for the player. Once the player is done playing, the player would complete their membership and show a valid ID to confirm their age and that the player is able to play casino games. In addition, the player may be able to enter their information on the gaming machines, but may still have to have a casino employee verify the age and identity to convert the temporary account into a permanent or current player account.

In one embodiment, the system 10 is configured to use the NFC enabled device to detect whether a patron is within the predetermined proximity to the gaming machine. The predetermined proximity may be the area around a gaming machine, a kiosk, a gaming table, a casino environment, etc. For example, in one embodiment, the NFC enabled device may receive the NFC tag from a patron in the predetermined area around a gaming machine. Upon receiving the NFC ID, the system 10 may log the patron into the associated player tracking account on the player tracking device. The player tracking account is stored in the system database. Once a player is identified via the NFC ID received through the NFC reader on the player tracking device, the player tracking device downloads the credits in the account to the EGM meter and tracks the play associated with the NFC ID. Before logging the player into the gaming machine, the system 10 may request a personal identification number (PIN) that is associated with the player tracking account.

In addition, the system 10 may include NFC enabled player gaming tracking devices that are coupled to a monitoring services server and configured to allow players to access player account services using player identification data transmitted wirelessly using NFC enabled devices to display gaming services provided by the monitoring services server on a corresponding gaming machine.

In one embodiment, the system 10 allows a player to access services provided by the player tracking server via a NFC device on a mobile computing device and/or a NFC enabled card that allows the player/user to log into the player account using the player gaming tracking device associated with a gaming machine and/or a kiosk coupled to the player tracking server. The tap-on of the NFC device may bring up a web page on the mobile computing device and all of the applications are run and/or displayed on the mobile computing device. The log-in information may be hard coded in order to allow the player easy access when reentering the gaming machine via the mobile computing device.

In addition, the system 10 may include a player gaming tracking device that includes a card reader configured to receive a physical card having player identification data encoded on a magnetic strip. The player gaming tracking device is configured to allow a player to log into the player's account by using the player tracking card and track the player's gaming activity. In addition, the system 10 may use hybrid cards, i.e., magnetic stripe encoding and NFC encoding.

In another embodiment, the player may log into the player tracking gaming device using the NFC enabled device and simultaneously allow a casino operator employee to access the casino management system via the player gaming tracking device to transmit data to and/or from the employees NFC enabled mobile device and the NFC enabled player gaming tracking device. For example, the player may be playing a game on the gaming machine while another user, gaming employee, with a priority higher than the player may also be able to access the same gaming machine to see the corresponding player tracking account, award a jackpot to a player, and/or any gaming related activities the gaming employee may have. Each user is given a priority which allows the NFC enabled device to log-in a player with a higher priority while a player with a lower priority is logged-in to the gaming machine. For example, a casino employee will have a higher priority than a player.

A selected embodiment of the invention will now be explained with reference to the drawings. It will be apparent to those skilled in the art from this disclosure that the following description of the embodiment of the invention is provided for illustration only and not for the purpose of limiting the invention as defined by the appended claims and their equivalents.

Figure 2:
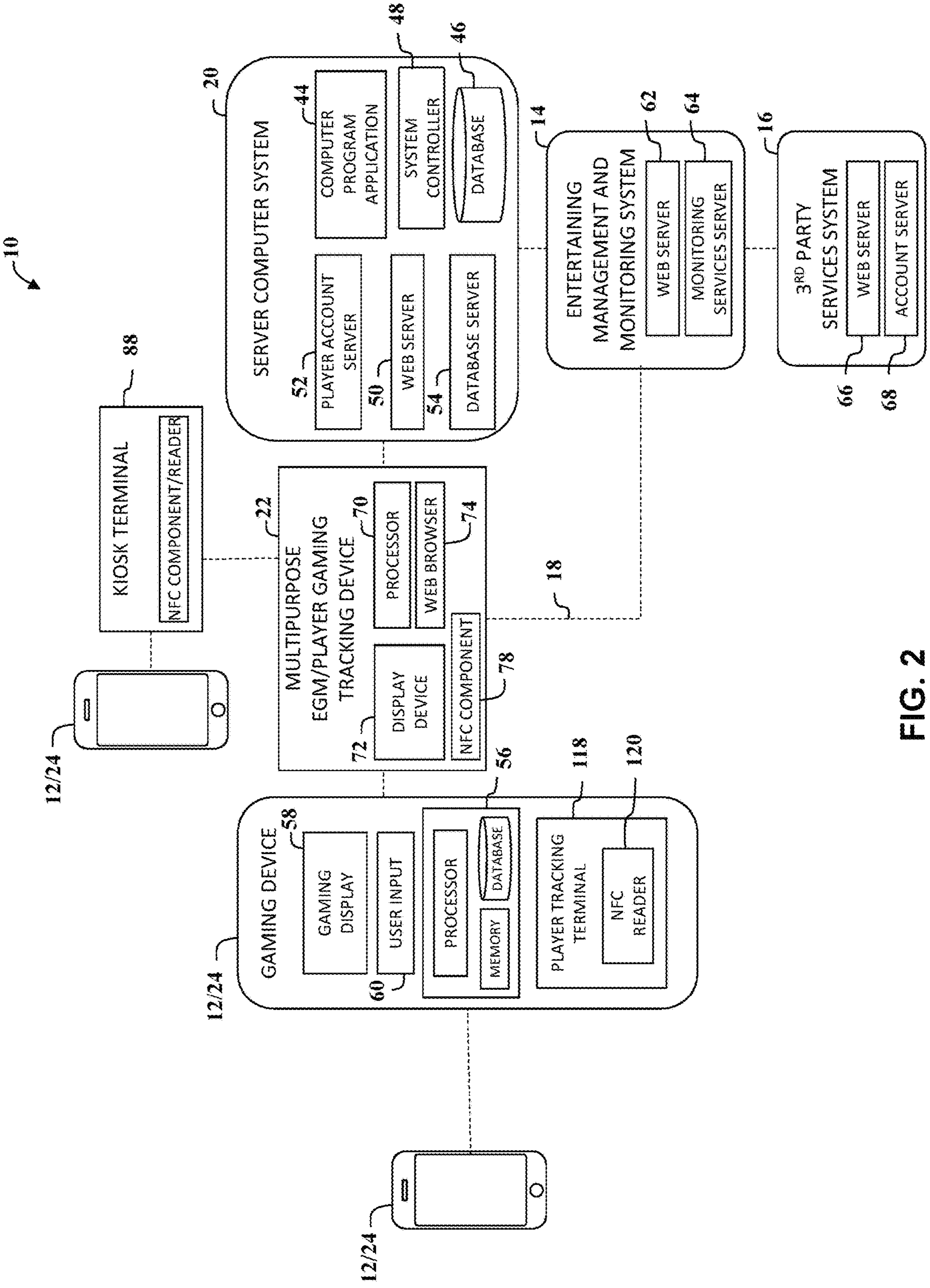
FIG. 2 is another schematic diagram of the networked computer system shown in FIG. 1.
Figure 3:
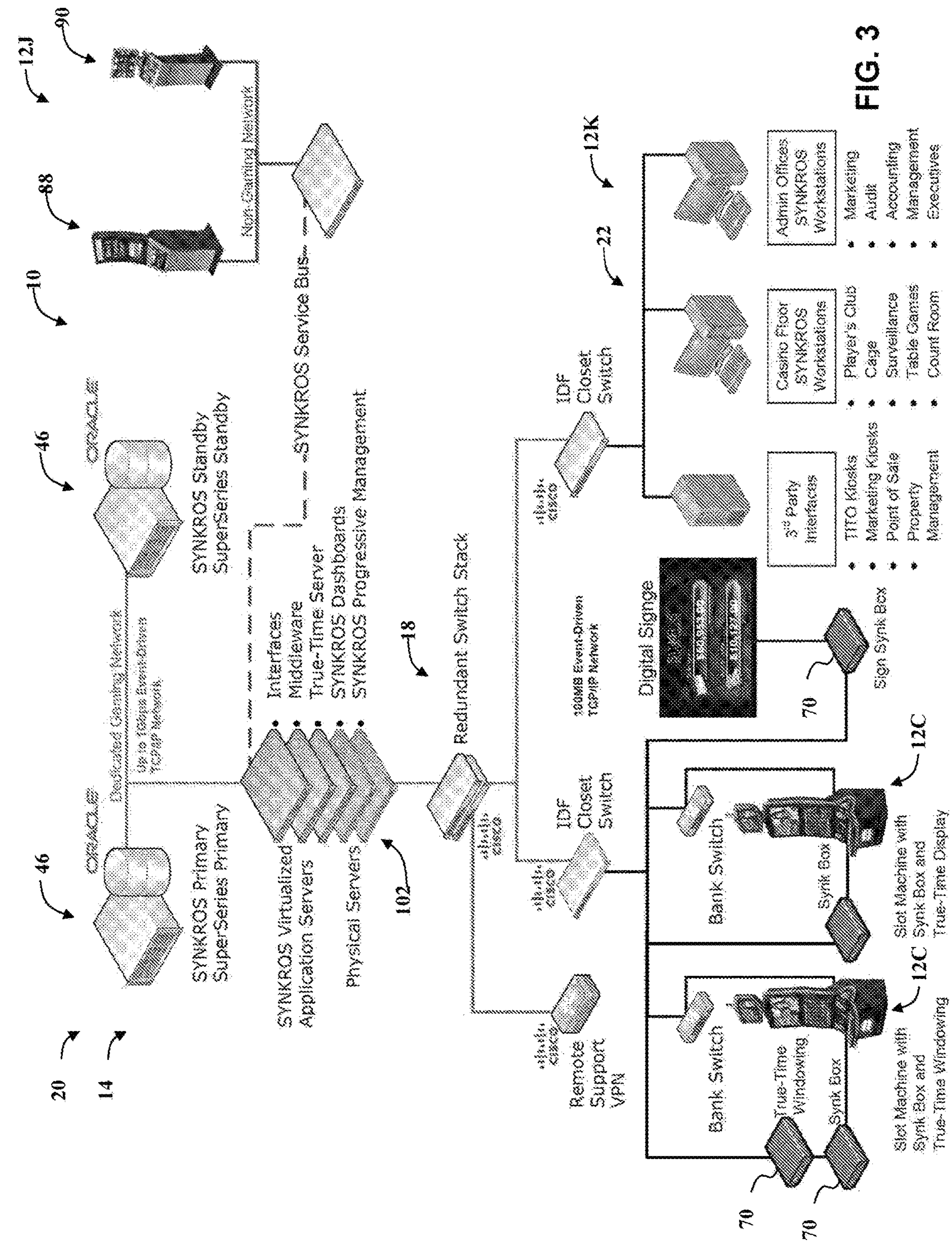
FIGS. 3 and 4 are additional schematic representations of the system shown in FIG. 1, according to an embodiment of the present invention.

Referring to FIGS. 1-3, in the illustrated embodiment, the system 10 includes a plurality of devices 12 that are coupled to an entertaining management and monitoring system 14 and a 3rd party services system 16 with a communications network 18. The entertaining management and monitoring system 14 includes a server computer system 20 and is coupled to the plurality of devices 12 for use in tracking patron events at each of the devices 12. In one aspect of the present invention, the devices 12 may be gaming machines 12A-12H, or non-gaming machines 12J-12L, such as, for example, point-of-sale (POS) terminals, gaming tables, and/or sports book terminals.

For example, in one embodiment, a non-gaming machine 12J, 12K, 12L, may include a user computer device 12 that is configured to transmit and receive data to and/or from the server computer system 20 to display graphical interfaces to enable a user to interact with and operate the system 10 with the user computing device 12.

FIG. 1 is a schematic representation of the system 10, according to an embodiment of the invention. In the illustrated embodiment, the system 10 includes one or more user computing devices 12, the entertaining management and monitoring system 14, the 3rd party services system 16, and the server computer system 20 that is connected to the user computing devices 12, the entertaining management and monitoring system 14, and the 3rd party services system 16.

The system 10 also includes one or more player gaming tracking devices 22 that is coupled to a corresponding gaming device 12, an entertaining management and monitoring system 14, a 3rd party services system 16, and a server computer system 20 to transmit and receive data to and/or from the gaming device 12, the entertaining management and monitoring system 14, the 3rd party services system 16, and the server computer system 20 to display graphical interfaces on the gaming device 12 and to enable a user/player to log-in/log-out and to access and purchase goods and services provided by the entertaining management and monitoring system 14 and/or the 3rd party services system 16 via the user computing device 12.

In the illustrated embodiment, the server computer system 20 is coupled to each user computing device via the communications network 18 that enables each user computing device to access the server computer system 20 over the network 18 such, as, for example, the Internet, a cellular telecommunications network, a wireless network and/or any suitable telecommunication network. The mobile computing device 24 may include any suitable device that enables the user to access and communicate with the system 10 including sending and/or receiving information to and from the system 10 and displaying information received from the system 10 to the user. For example, in one embodiment, the user computing device 12 may include a mobile computing device 24, e.g., a smartphone that communicates with the server computer system 20 via the cellular telecommunications network and/or the Internet. In another embodiment, the user computing device 12 may include a personal computer, laptop, cell phone, tablet computer, smartphone/tablet computer hybrid, personal data assistant, and/or any suitable computing device that enables a user to connect to the server computer system 20. For example, in one embodiment, a non-gaming machine may include a mobile computing device 24 that is configured to transmit and receive data to and/or from the server computer system 20 to display graphical interfaces to enable a patron to interact with and operate the system 10 with the mobile computing device 24. The mobile computing device 24, as well as any other connected computer systems and their components included in the system 10, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Figure 7:
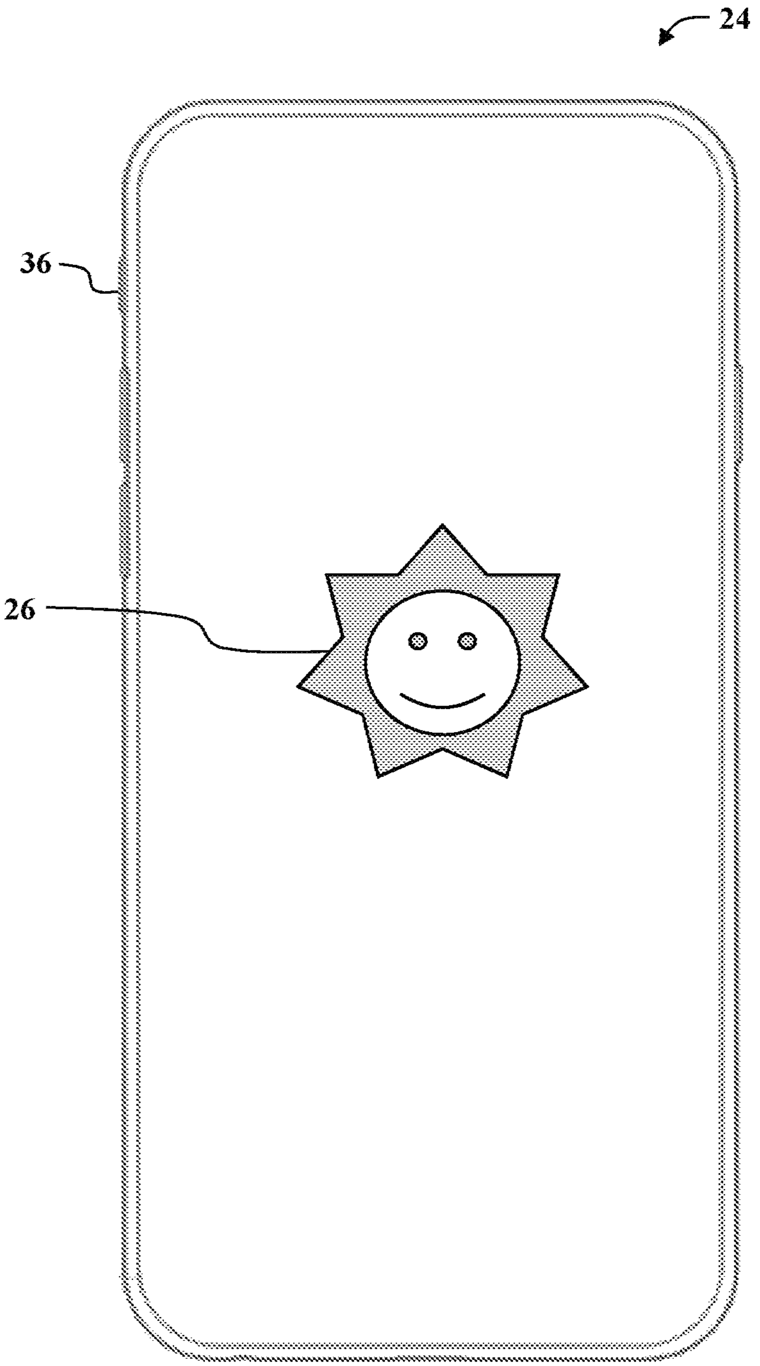
FIGS. 7 and 8 is a schematic of a mobile computing device that may be used with the system shown in FIGS. 1-4, according to an embodiment of the present invention.
Figure 8:
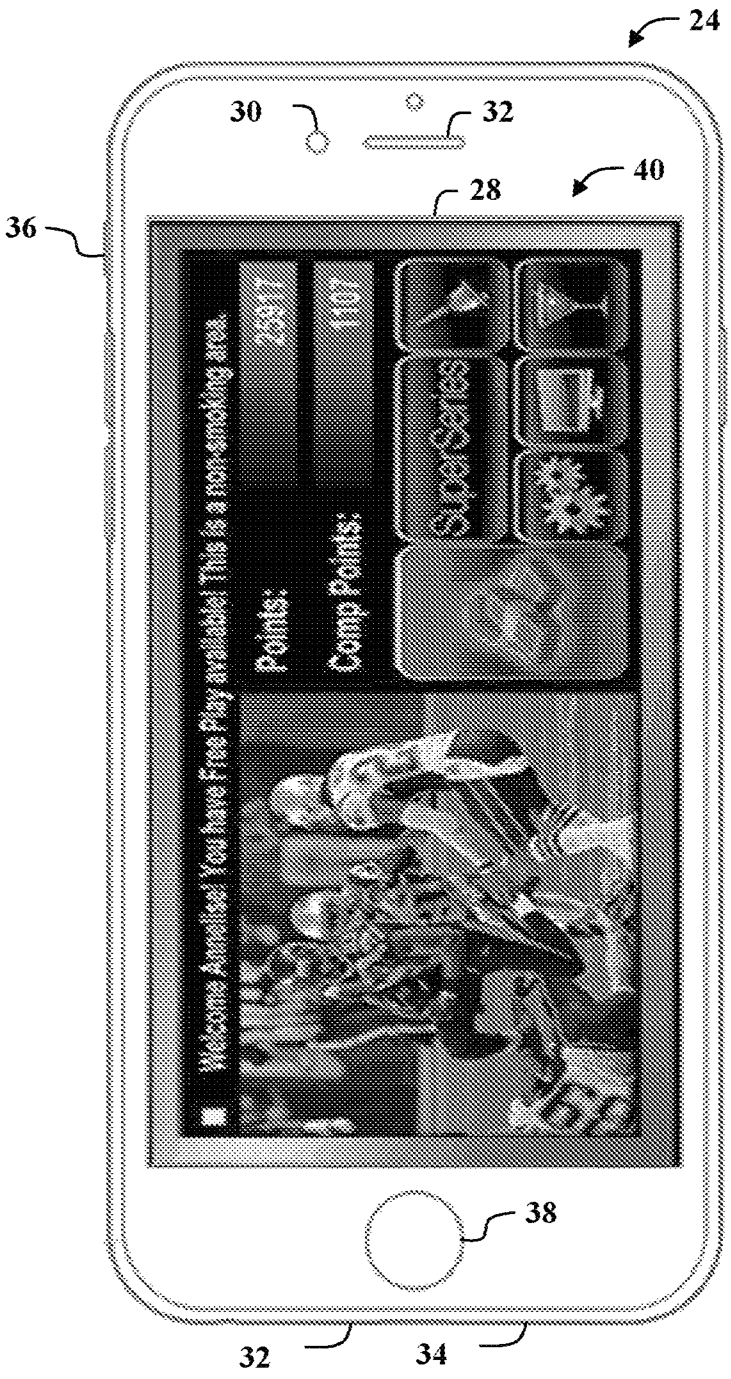

In one embodiment, the mobile computing device 24 (shown in FIGS. 7 and 8) includes, for example, a smartphone such as an iPhone™. The mobile computing device 24 includes a processor coupled to a memory device, a NFC component 25, and a database for storing various programs and data for use in operating the mobile computing device 24. The NFC component 25 may be inside of the mobile computing device 24 or on the outside of the mobile computing device 24 as shown in FIG. 7. The mobile computing device 24 may also include a touchscreen display device 28, one or more video image cameras 30, one or more speakers 32, a microphone 34, at least one input button 36, and one or more sensors including, but not limited to, a touch ID fingerprint sensor coupled to an input button 38, a barometer, a three-axis gyro, an accelerometer, proximity sensor, and an ambient light sensor. In addition, the mobile computing device 24 may also include a Wi-Fi antenna, a cellular network antenna, a Bluetooth™ communications device, assisted GPS and GLONASS, a digital compass, a NFC component 25, and an iBeacon microlocation device. The NFC component 25 on the outside of the mobile computing device 24 is known as a NFC tag 26 (described below).

In the illustrated embodiment, the mobile computing device 24 includes a web browser programmed and stored in the memory device. The processor executes the web browser program to display web pages on the touchscreen display device 28 that includes information received from the entertaining management and monitoring system 14 to enable the user to interact with and operate the server computer system 20. In addition, the mobile computing device 24 may be programmed to store and execute a mobile program application, e.g., a mobile application, that displays a user interface 40 (shown in FIG. 8) on the touch screen display device 28 that allows the user to access the server computer system 20 to retrieve and store information within the database as well as interact with and operate the server computer system 20. In addition, in one embodiment, the system 10 may install one or more mobile application programs in the memory device of the mobile computing device 24. When initiated by the processor of the mobile computing device 24, the mobile application program causes the processor of the mobile computing device 24 to perform some or all of the functions of the server computer system 20. Other types of gaming machines which may be included are indicated with reference number 12.

In the illustrated embodiment, the server computer system 20 may include one or more host computers 42. The gaming machines 12 are connected via a network 18 to one or more host computers 42, which are generally located at a remote or central location. The host computer 42 includes computer program application(s) 44 which maintains one or more databases 46. The computer program application(s) 44 and databases 46 may be used to record, track, and report accounting and monitoring information regarding the player gaming tacking device 22 and players and/or gaming attendant/casino employee interaction via the gaming devices 12 through the NFC reader of the player gaming tracking device 22. Additionally, the computer program application (s) 44 and databases 46 may be used to maintain information related to player or player tracking accounts. One or more host work stations (not shown) may be coupled to the host computer 42 to allow a casino operator employee to access the host computer 42 via the host computer workstation.

In another embodiment, the server computer system 20 includes a system controller 48, a web server 50, a player account server 52, and a database server 54. In one embodiment, the database(s) are Oracle database(s). The servers 50-54, system controller 48, and database 46 are connected through a network 18 such as, for example, a local area network (LAN), a wide area network (WAN), dial-in-connections, cable modems, wireless modems, and/or special high-speed Integrated Services Digital Network (ISDN) lines.

Each current patron is associated with a current player tracking account and each temporary patron may be associated with a temporary player tracking account until the patron is identified and verified, described below. It should be appreciated that the term "patron" refers to a "current player", a "current patron", a "temporary patron", "temporary player", "user" and/or a "player" as used in the subsequent description.

In the illustrated embodiment, as shown in FIG. 2, each gaming device 12 includes a gaming controller 56 that is coupled to a gaming display 58 and a user input device 60. The gaming controller 56 receives and transmits information to and from the player gaming tracking device 22 and/or the server computer system 20 and displays the graphical interfaces on the gaming display 58 to enable the user/player to interact with the server computer system 20 and/or the player gaming tracking device 22 to access a player tracking account, access casino services, and purchase goods and/or services from the entertaining management and monitoring system 14 and/or the 3rd party services system 16 in accordance with the embodiments described herein.

The web server 50 communicates with the gaming devices 12, the entertaining management and monitoring system 14, and the 3rd party services system 16 to facilitate transmitting data over the network 18 via the Internet and/or the cellular network, respectively.

The database server 54 is connected to the database 46 to facilitate transmitting data to and from the database 46. The database 46 contains information on a variety of matters, such as, for example, player tracking ID(s), player account information, NFC IDs, gaming property information, 3rd party information, image data for producing graphical interfaces and/or screens on the gaming device 12 and temporarily stores variables, parameters, and the like that are used by the system controller 48. In one embodiment, the database 46 includes a centralized database that is stored on the system 10 and is accessed directly via the gaming devices 12 and/or the player gaming tracking device 22. In an alternative embodiment, the database 46 is stored remotely from the system 10 and may be non-centralized.

The player account server 52 receives player tracking data from the player gaming tracking device 22 and generates and stores the received player tracking data in corresponding player accounts stored in the database 46. In addition, the player account server 52 retrieves a player account and transmits the player tracking data to the player gaming tracking device 22, the gaming device 12, the entertaining management and monitoring system 14 and/or the 3rd party services system 16. The player account server 52 also receives player tacking ID(s) and NFC IDs that correspond to player accounts in order to log players in and out of the player gaming tracking device 22.

The system controller 48 includes a processor and a memory device that is coupled to the processor. The memory device includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the processor to store, retrieve, and/or execute instructions and/or data.

The processor executes various programs, and thereby controls other components of the system 10, the player gaming tracking device 22, and the gaming devices 12 according to user instructions and data received from the gaming devices 12. The processor in particular executes a program, and thereby enables the system 10 to allow the player to access information, goods, and/or services provided by the player account server 52, the entertaining management and monitoring system 14, and the 3rd party services system 16 in response to user instructions received via the gaming devices 12 in accordance with the embodiments described herein. The memory device stores programs and information used by the processor. Moreover, the memory device stores and retrieves information in the database 46 including, but not limited to, image data for producing images and/or screens on the gaming display 58, and temporarily stores variables, parameters, and the like that are used by the processor.

In the illustrated embodiment, a player may use the gaming device 12 to access goods and services provided by the entertaining management and monitoring system 14 and/or the 3rd party services system 16 such as, for example, restaurant reservations, show reservations, casino services, hotel services, travel arrangements, and/or any suitable goods and/or services that enables the system 10 to function as described herein. In addition, the player may access a corresponding player tracking account with the gaming device 12 via a NFC reader. As described herein, the player may use the NFC component 25 and/or NFC tag 26 on the mobile computing device 24 to tap-on the NFC reader or be within a predetermined proximity to the NFC reader, which broadcasts an NFC signal that includes a unique NFC ID to the player tracking device 22. The player tracking device 22 may then send the data received NFC ID to the server computer system 20 to determine a corresponding player tracking account. The player gaming tracking device 22 that received the NFC ID may also receive the location ID associated with the gaming device 12 and transmit the player account information and the gaming device location ID to the entertaining management and monitoring system 14 and/or the 3rd party services system 16. The entertaining management and monitoring system 14 and/or the 3rd party services system 16 may select services associated with the received player account information and/or the gaming device location and transmit data indicative of the selected services to the server computer system 20 and/or the player gaming tracking device 22 to display the services on the gaming device 12.

In the illustrated embodiment, the entertaining management and monitoring system 14 includes a web server 62 that is configured to facilitate communication of data to and/or from the player gaming tracking device 22, the server computer system 20, and/or the 3rd party services system 16. The entertaining management and monitoring system 14 may also include a monitoring services server 64 that is configured to transmit data indicative of goods and services offered by the gaming property to the server computer system 20 and/or the player gaming tracking device 22 as a function of the received player ID and/or gaming device location. The 3rd party services system 16 includes a web server 66 to facilitate communicating with the entertaining management and monitoring system 14 and/or the server computer system 20, and an account server 68 that is configured to transmit data indicative of the goods and services provided by the 3rd party service system as a function of the received player ID, received NFC ID, and/or the gaming device location.

In one embodiment, the system 10 includes a gaming tracking device 70 (SYNKBOX™) that is coupled to the gaming device 12 and the server computer system 20 to receive gaming property services from the server computer system 20 and display the gaming property services on the gaming display 58. Moreover, the gaming tracking device 70 is configured to receive gaming property services from the server computer system 20 and transmit services data indicative of the gaming property services to gaming device 12. In one embodiment, the gaming tracking device 70 is a multipurpose EGM/player tracking device 22 that is connected to one or more gaming machines 12. In one embodiment, the gaming tracking device 70 includes a housing that contains a processor and a display controller configured to control and/or drive the gaming display 58 included with the gaming machine 12. For example, in one embodiment, the gaming tracking device 70 includes a True Time Windows™ computer program that drives a picture-in-picture gaming display 58.

In the illustrated embodiment, the player gaming tracking device 22 is coupled to the gaming device 12 and the entertaining management and monitoring system 14 to receive gaming property services from the entertaining management and monitoring system 14 and display the gaming property services on the gaming display 58. Moreover, the player gaming tracking device 22 is configured to receive gaming property services from the entertaining management and monitoring services server 64 and transmit services data indicative of the gaming property services to the gaming device 12. In one embodiment, the player gaming tracking device 22 is a gaming tracking device or a multipurpose EGM/player tracking device that is connected to one or more gaming machines 12. Additional details of multipurpose EGM/player tracking devices, which may be used in the present invention, are described in U.S. patent application Ser. No. 12/235,237 to Edward Sepich et al., now U.S. Pat. No. 8,429,229, filed Sep. 22, 2008, titled "Multipurpose EGM/player Tracking Device and System", which is incorporated herein by reference in its entirety.

In the illustrated embodiment, the player gaming tracking device 22 includes a processor 72 and a display device 74 configured to control and/or drive the gaming display 58 included with the gaming device 12. The player gaming tracking device 22 also includes a web browser program 76 for use by the processor 72 to generate and display a web browser interface 74. The web browser interface 74 enables a player to access the gaming property services via a website provided by the entertaining management and monitoring system 14. In one embodiment, the player gaming tracking device 22 is configured to receive webpage data indicative of the gaming property services from the entertaining management and monitoring property web server 62 and/or the 3rd Party web server 66, generate a services webpage as a function of the received webpage data, and transmit the services webpage to the gaming device 12 for use in displaying the services webpage on the gaming display 58. In addition, the player gaming tracking device 22 may be configured to transmit between the player and the entertaining management and monitoring web server 62 and/or server 64 via the services webpage to facilitate providing gaming property services to the player. In another embodiment, the player gaming tracking device 22 includes a NFC component 78 which is configured to detect, read, receive, and transmit near field communication (NFC) data between a the mobile computing device NFC component 25 and/or NFC tag 26 and the entertaining management and monitoring server 64 to initiate the process of logging the player into and out of the player gaming tracking device 22.

In the illustrated embodiment, the display device 74 is configured to display a player interaction screen 80 including a gaming content section and a non-gaming content section using a picture-in-picture display. Moreover, the display device 74 displays a game being generated by the gaming controller 56 within the gaming content section and displays a services website 86 in the non-gaming content section. More specifically, the display device 74 is configured to receive game data indicative of game play from the gaming controller 56, receive services data indicative of the services website 86 including the gaming property services from the player gaming tracking device 22 and display the game and the gaming property services on the player interaction screen 80. In one embodiment, the gaming display 58 includes a touchscreen. The display device 74 relates player selections received via the touchscreen to the player gaming tracking device 22 to enable the player gaming tracking device 22 to allow the player to interact with the services website 86 via the touchscreen. Similarly, the display device 74 transmits player selections to the gaming controller 56 to enable the gaming controller 56 to conduct game play in response to players' selections. In the illustrated embodiment, the display device 74 may adjust a size, orientation, and/or position of each of the gaming content section and the non-gaming content section based on the input received from the player. For example, in one embodiment, the display device 74 may allow the player to select a region on the touchscreen corresponding to the services website 86 being displayed in the non-gaming content section and enlarge the non-gaming content section to allow a larger portion of the services website 86 to be viewable to the player on the gaming display 58. Additional details of the gaming tracking device 22 and system components for use in displaying the player interaction screen 80, which may be used in the present invention, are described in U.S. patent application Ser. No. 14/488,174 to Jeffrey D. George et al., filed Sep. 16, 2014, titled "System and Methods of Providing Player Services with Gaming Devices", now U.S. Pat. No. 9,619,962, which is incorporated herein by reference in its entirety.

In one embodiment, the player gaming tracking device 22 may display advertising information received from the monitoring services server 64 and/or the 3rd party server 66 in the non-gaming content section of the player interaction screen 80. In addition, the player gaming tracking device 22 may receive and display a live video broadcast image of a sporting event, gaming tournament, logo, or special event provided by the monitoring services server 64 and/or the 3rd party server 66. In addition, the player gaming tracking device 22 may display images indicative of bonus feature games, such as progressive games, slot tournaments, and/or system based awards that are received for the server computer system 20. In addition, the player gaming tracking device 22 may display player information obtained from a player account associated with the player in the non-gaming content section.

In one embodiment, the player gaming tracking device 22 is configured to transmit a webpage request to the monitoring services server 64 and/or server 66 to display the services webpage on the gaming display 58. The webpage request may include a URL and a unique player identifier associated with the player for use by the entertaining management and monitoring system 14 to determine the gaming property services provided to the player as a function of the unique player identifier. Moreover, the player gaming tracking device 22 may be configured to determine a unique machine identifier associated with the gaming device 12 and transmit the webpage request including the unique machine identifier to the monitoring services server 64 to enable the entertaining management and monitoring system 14 to determine a location of the gaming device 12 as a function of the unique machine identifier, and to determine the gaming property services being provided to the player as a function of the location of the gaming device 12.

The player gaming tracking device 22 may also monitor and track the property services being accessed by the player via the website 64, and generate and transmit tracking data indicative of the player's activity and services accessed through the website to the server computer system 20 for use in storing the tracking data in a corresponding player account. In addition, the player gaming tracking device 22 may determine if the player purchases one or more gaming property services through the services website 86 and responsively provide an award to the player as a function of the purchased gaming property service. For example, in one embodiment, the gaming property may provide an incentive to the player to use the services website 86. The player gaming tracking device 22 may detect when the player accesses the services website 86 and provide bonus points, loyalty points, and/or cashless wagering credits to the player as an award for accessing and/or purchasing gaming property services via the services website 86.

In one embodiment, the player gaming tracking device 22 may be configured to determine a player account associated with the player as a function of the unique NFC ID, and allow the player to purchase gaming property services via the services website 86 using bonus points contained in the player account. In addition, the player gaming tracking device 22 may allow the player to purchase gaming property services via the services webpage using cashless wagering credits associated with the player account. For example, in one embodiment, the player gaming tracking device 22 may determine a player account associated with the player as a function of the unique NFC ID, determine an amount of bonus points and cashless wagering credits included in the player account; and allow the player to purchase gaming property services via the services website 86 with the bonus points and cashless credits included in the player account.

Figure 6:
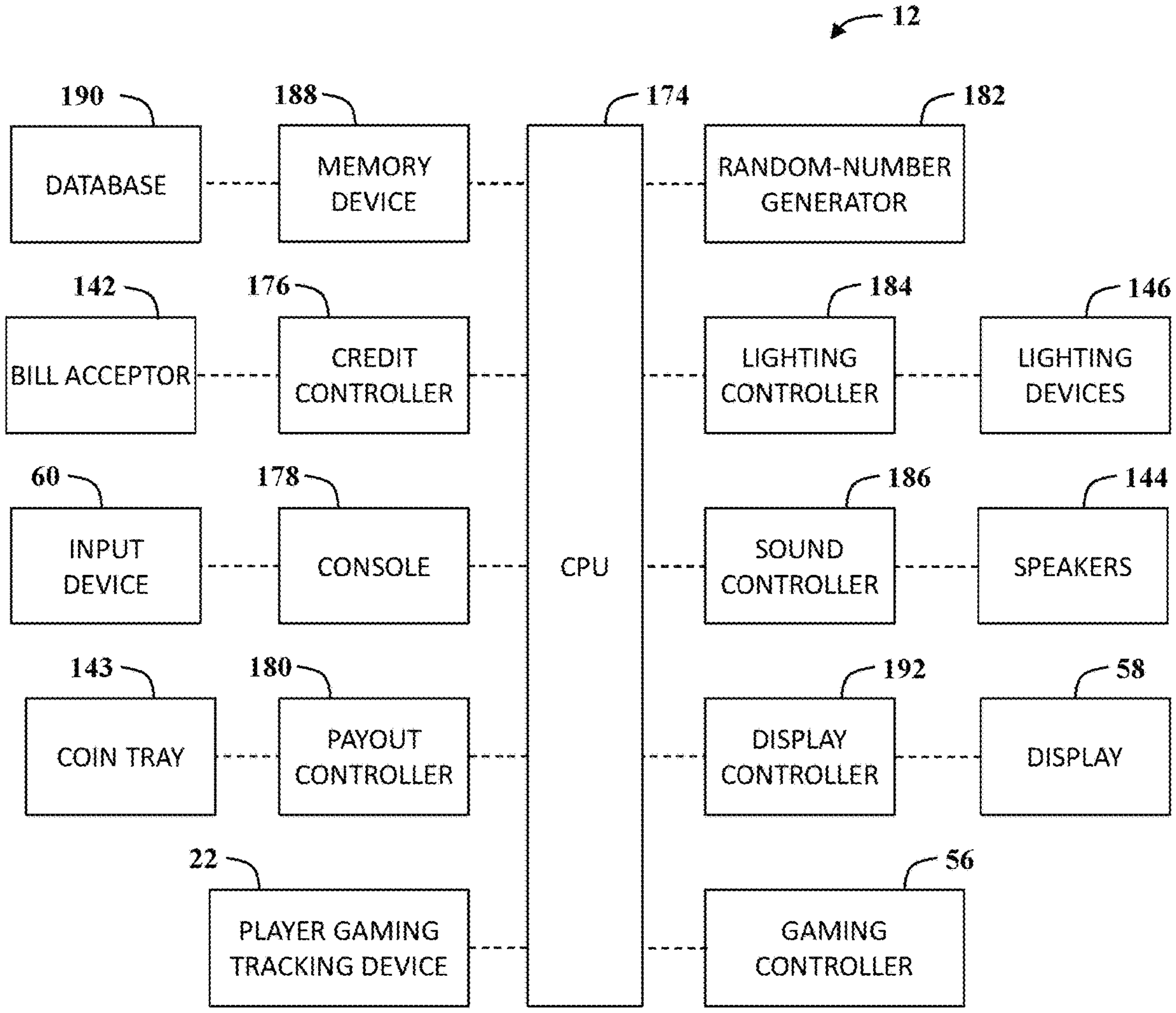
FIG. 6 is a schematic representation of the gaming device shown in FIG. 5, according to an embodiment of the present invention.

In one embodiment, the system 10 and method may be embodied or implemented via an entertaining management and monitoring system 14 which is shown in block form in FIG. 6. The entertainment and monitoring system 14 may include additional functions such as, real-time multi-site, slot accounting, EGM monitoring, player tracking, cage credit and vault, sports book data collection, Point of Sale (POS) accounting, keno accounting, bingo accounting, and table game accounting, a wide area progressive jackpot, and electronic funds transfer (EFT), as well as interfaces to other gaming and non-gaming systems. In addition, the system 10 may be configured to track data related to the play of one or more gaming devices 12. Two such systems are disclosed in U.S. patent application Ser. No. 11/094,605, filed Mar. 30, 2005, now U.S. Pat. No. 7,303,475, which is hereby incorporated by reference.

As shown, the system 10 includes a plurality of gaming devices 12. Gaming devices 12 may include, but are not limited to gaming machines, electronic gaming machines (such as video slot, video poker machines, or video arcade games), multi-terminal electronic gaming machines, server-based gaming machines, virtual EGMs, e.g., for online gaming, and an interface to a table management host workstation 42 for table games, kiosks 88, point of sale or redemption terminals 90, mobile computing devices 24 or other suitable devices at which a patron may interact or access a user or player account. In the illustrated embodiment, nine electronic gaming devices or game machines (EGMs) 12 are shown. However, it should be noted that the present invention is not limited to any number or type of gaming machine 12. In one embodiment, the gaming machines 12 are organized into banks (not shown), each bank containing a plurality of gaming machines 12.

In general, the gaming machines 12 may be used by a user or player, i.e., to access their player account or services through the player gaming tracking device 22, i.e., the multipurpose EGM/player tracking device. Examples of player services include, but are not limited to, accessing and performing operations including (1) logging the player in and out of the player tracking account, (2) point and complementary point balances, (3) accessing and performing operations on awards such as, bonuses, incentives, progressives etc., (4) accessing and performing operations on saved player preferences and account information such as, PIN, default language, show/hide points, and other player and Bonusing features. For example, the player may select one of the gaming machines 12 to play a game and insert a coin, credit, coupon, tap on with a NFC enabled device or card and/or insert a player tracking card (not shown) into the chosen gaming machine 12. Generally, the gaming machine 12 has an associated number of credits or coins required in order to play. In the case of video slot or poker games, the game is played and an award or Bonus in the form of credits or other complementary points may be awarded through the multipurpose EGM/player gaming tracking device 22 to the gaming machine 12. In the case where the user is a gaming attendant and/or gaming property employee, having a higher priority than the player, the gaming attendant may interact with the multipurpose EGM/player gaming tracking device 22 to access gaming machine 12 services, such as, perform a fill, acknowledge a jackpot, link or associate a particular multipurpose EGM/player tracking device to the gaming machine 12, interrogate gaming machine 12 meters, bill insertions and other access or perform other EGM specific gaming services. For example, the gaming property employee may be able to log into the EGM while the player is still logged in, in order to award the player with a jackpot (described herein). The player card, player tracking ID, and/or NFC ID do not have to be logged out in order for the employee to tap-in and/or card-in and award the jackpot while the player is still carded in or logged into the gaming machine 12.

In one embodiment, the server computer system 20 may also include one or more middleware application server computers 92 and one or more database server computers 94. Each middleware application server computer 92 being associated with one or more gaming machines 12. The middleware application server computer 92 acts as go-between between the associated gaming machines 12 and multipurpose EGM/player gaming tracking device 22 and one or more database servers 54 which are used to provide game services, e.g., progressive awards, player tracking services, accounting services, and the like.

The database server computer 94 includes a database server processor 96 that is coupled to a database memory device 98 that includes the database 46. The database server processor 96 is programmed to retrieve and store information contained in the database 46. The database 46 contains information on a variety of matters, such as, for example, web pages associated with one or more websites, patron program files (including both current player program files and temporary player program files), player account information and temporary player account information, player wagering information and temporary player wagering information, player ranking information and temporary player ranking information, tier level program files, postal code information, patron comp point value information, patron purchasing information, player priority data and temporary player priority data, and casino priority data, and/or any suitable information that enables the system 10 to function as described herein.

The middleware application server computers 92 include a patron evaluation server computer 100 that includes a central processing unit (CPU) including an application processor 102 that is programmed to communicate with each of the gaming devices 12 and the database server computer 94. In the illustrated embodiment, the application processor 102 includes a communication module 104 and a patron tracking module 106. The communication module 104 is programmed to communicate with the system devices 12 and/or player tracking devices 22 to facilitate transmitting data over the network 18. The communication module 104 is also programmed to access and retrieve information being stored in the database 46 and transmit information being received from, or generated by, the application processor 102 to the database server computer 94.

The server computer system 20 may also include a NAMB2 server 108 that may be used to download software executables to each multipurpose EGM/player gaming tracking device 22 and uses a checksum process (e.g., MDX SUM signature) to verify the software. The NAMB2 server 108 may also provide entertainment audio or video streams to each multipurpose EGM/player gaming tracking device 22 over the communications link 18 as well as other player and gaming attendant services such as, remote help, Internet access, and non-gaming revenue services such as, reservations, valet, shopping, and others.

In one embodiment, the communication module 104 includes a web-browser program that generates and transmits software code including, but not limited to HTML, JavaScript, C++, and/or any suitable programming code that enables the gaming machine 12, table management host workstation 42 for table games, kiosks 88, point of sale or redemption terminals 90, and/or other devices 12 to display a website and/or webpages. The communication module 104 may be programmed to host a website including webpages that are accessible by a user via one or more client devices 12. The communication module 104 executes a website application program that retrieves code from the database 46 and executes the application code to render one or more webpages on a display device of a client device 12 in response to requests received from the user via the client device 12 to allow users to interact with the website. For example, in one embodiment, the communication module 104 may be configured to generate and display a web browser interface on a client device 12 such as, for example, the gaming machine 12C, using the gaming tracking device 22. The web browser interface enables a player to access the gaming property services via a website provided by the system 10. In one embodiment, the gaming tracking device 22 is configured to receive webpage data indicative of the gaming property services from the communication module 104 and transmit the services webpage to a gaming machine 12C for use in displaying the services webpage on the gaming display 58. In addition, the gaming tracking device 22 may be configured to transmit information between the patron and the server computer system 20 via the services webpage to facilitate providing gaming property services to the player.

Figure 4:
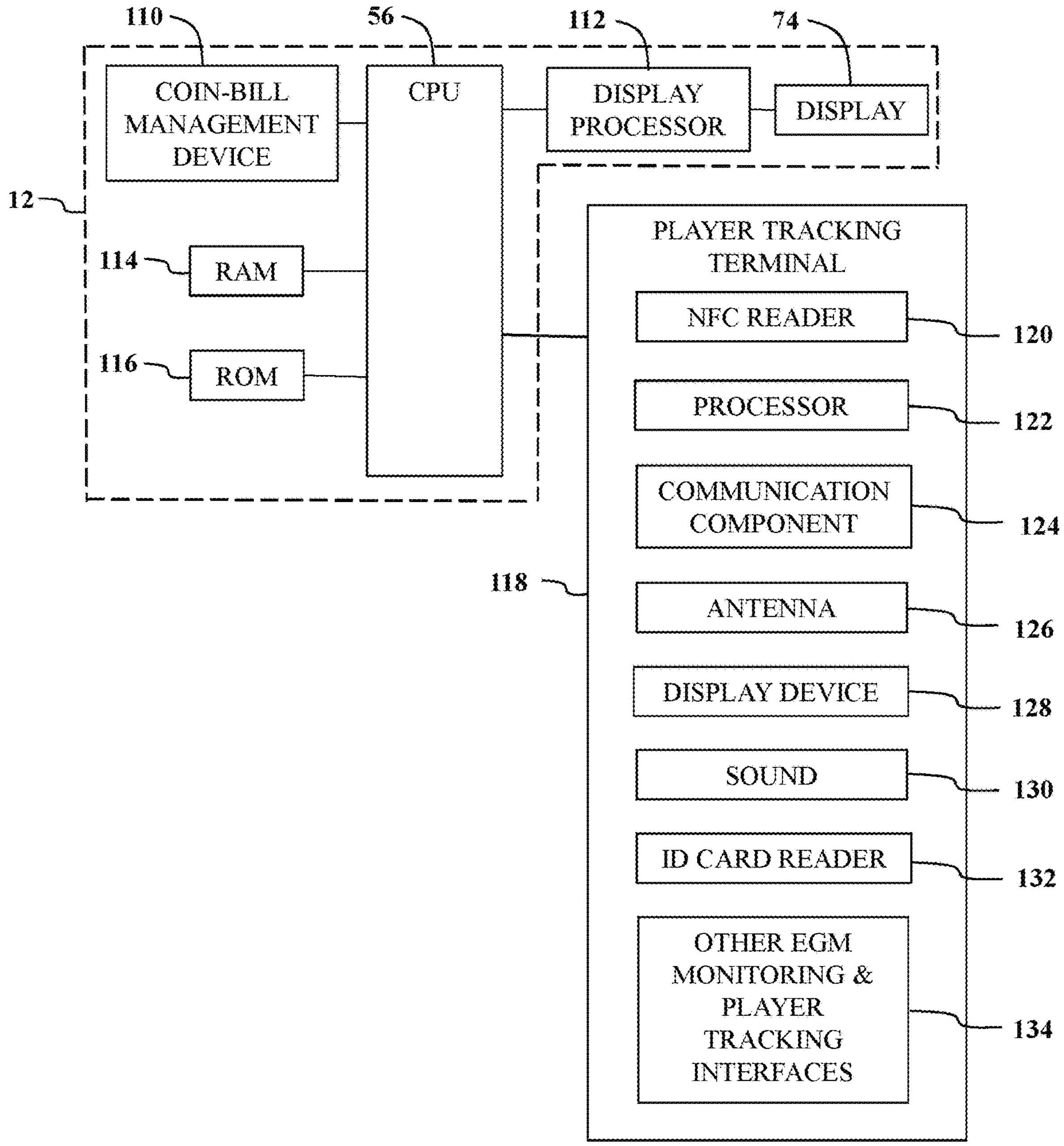

With reference to FIG. 4, in one embodiment, the gaming machine 12 may include gaming controller 56, or central processing unit (CPU), a coin-bill management device 110, a display processor/device 112, a RAM 114 as a memory device and a ROM 116 (generally provided as an EPROM). The CPU 56 is mainly composed of a microprocessor unit and performs various calculations and motion control necessary for the progress of the game. The coin-bill management device 110 detects the insertion of a coin or a bill and performs a necessary process for managing the coin and the bill. The display processor 112 interprets commands issued from the CPU 56 and displays desirable images on a display 58. The RAM 114 temporarily stores programs and data necessary for the progress of the game, and the ROM 116 stores, in advance, programs and data for controlling basic operation of the gaming machine, such as the booting operation thereof, game code and graphics. In addition, the server-side hardware is tasked with the execution of the logic based on the use of the GPU versus the CPU. In another embodiment, the system 10 may have the logic in the camera itself or offload the processing to the SMIB, to a computer in the slot bank, in the IDF (wiring closet), the server room, an off-site cloud, etc. Input to the gaming machine 12 may be accomplished via mechanical switches or buttons or via a touchscreen interface (not shown).

In one embodiment, the player gaming tracking device 22 may include a player tracking terminal 118 that is coupled to the gaming machine 12 for use in identifying a player and/or gaming attendant to access player accounts stored on the database 46. The player or gaming attendant user is identified via a NFC ID broadcast by the NFC component 25 and/or NFC tag 26 of the mobile computing device (or NFC enabled card) and/or any other method of identifying the player or gaming attendant, such as, finger print, optical recognition, etc., via the NFC reader (described below) at each gaming machine 12. In addition, the player or gaming attendant user may be identified via the NFC component 25 and/or NFC tag 26 (NFC card or mobile computing device), which includes the NFC ID, on the Point of Service (POS), the Property Management Systems (PMS), Kiosks, or any other interfaced external system. The NFC ID is associated with a specific player account which may be paired to a current player account or create a temporary player account. Player accounts may be used, generally, to provide bonuses to a player, in addition to the award designated by, in the case of a video slot or poker machine, the gaming machine 12 pay table. These bonuses may be awarded to the player based on a set of criteria, including, but not limited to, a) the player's play on the EGM 22, b) the player's overall play, c) play during a predetermined period of time, and d) the player's birthday or anniversary, or e) any other definable criteria. Additionally, bonuses may be awarded on a random basis, i.e., to a randomly chosen player or randomly chosen game. Bonuses may also be awarded in a discretionary manner or based on other criteria, such as, purchases made at a gift shop or other affiliated location. Additionally, bonuses may be awarded to the player from any other gaming or non-gaming source, such as, Point of Service (POS), Property Management Systems (PMS), Kiosks, or any other interfaced external system.

In one embodiment, the player tracking terminal 118 may include, a near field communication (NFC) reader 120, a processor 122, and/or a numeric keypad (not shown), a communications component 124, an antenna 126, a display 128, a sound project device 130, a player identification card reader 132, and other EGM monitoring and player/gaming attendant tracking interfaces 134. In one embodiment, the display 74 is a touchscreen panel and the numeric keypad (not shown) is implemented thereon. The player tracking terminal 118 may be included on either the gaming machine 12 and/or the gaming player tracking device 22.

The player may be identified by entry of a NFC ID via NFC communication to the NFC reader 120 and entry of a player identification number (PIN) on the numeric key pad or touch screen panel display 128 or any other method of identifying the player or gaming attendant, such as, finger print, optical recognition, etc. The NFC ID communicates with the NFC reader 120 when the NFC component 25 and/or NFC tag 26 is within a predetermined proximity to the NFC reader 120. If the received NFC ID is not associated with a current player account the system 10 may create a temporary player account using the received NFC ID. The NFC communication includes a NFC ID which will be associated with the new temporary account.

Figure 5:
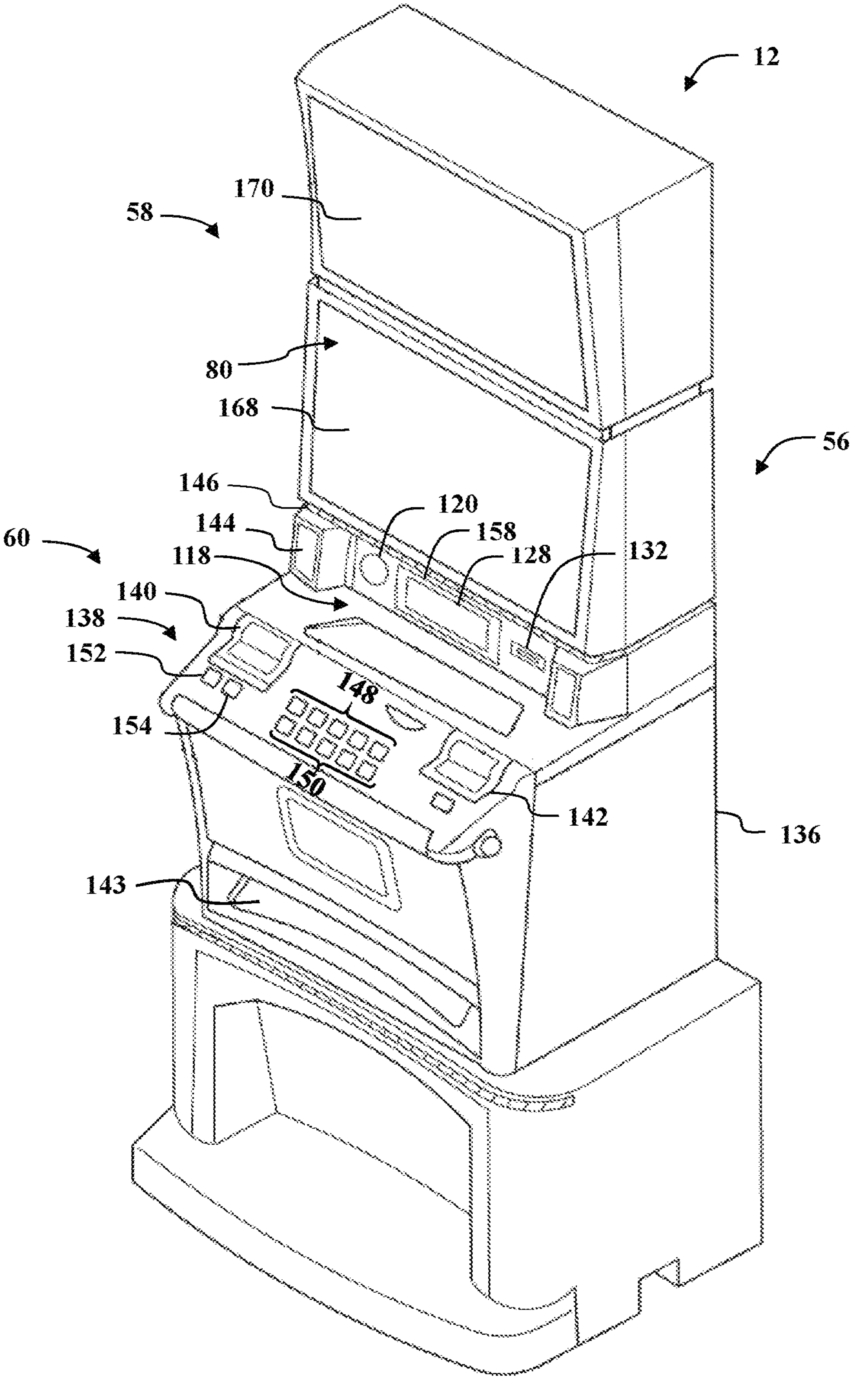
FIG. 5 is a perspective view of an exemplary gaming device that may be used with the system shown in FIGS. 1-4, according to an embodiment of the present invention.

FIG. 5 is a perspective view of an exemplary gaming machine 12. FIG. 6 is a schematic representation of the gaming device 12. In the illustrated embodiment, the gaming machine 12 is a video gaming machine preferably installed in a casino. In the illustrated embodiment, the gaming machine 12 includes the gaming display 58 for displaying a plurality of games, the user input device 60 to enable a player to interface with the gaming machine 12, the player tracking terminal 118 for logging players in and out of the EGM 12, and the gaming controller 56 that is operatively coupled to the gaming display 58, the player tracking terminal 118, and the user input device 60 to enable a player to play games displayed on the gaming display 58. The gaming machine 12 also includes a cabinet assembly 136 that is configured to support the gaming display 58, the user input device 60, the player tracking terminal 118, and/or the gaming controller 56 from a gaming stand and/or a supporting surface.

The gaming display 58 and the user input device 60 are coupled to the cabinet assembly and are accessible by the player. In one embodiment, the gaming controller 56 is positioned within the cabinet assembly. Alternatively, the gaming controller 56 may be separated from the cabinet assembly, and connected to components of the gaming machine through a network such as, for example, a local area network (LAN), a wide area network (WAN), dial-in-connections, cable modems, wireless modems, and/or special high-speed Integrated Services Digital Network (ISDN) lines.

In one embodiment, the user input device 60 includes a plurality of input buttons 138, a coin slot 140, and/or a bill acceptor 142. The coin slot 140 includes an opening that is configured to receive coins and/or tokens deposited by the player into the gaming machine 12. The gaming machine 12 converts a value of the coins and/or tokens to a corresponding amount of gaming credits that are used by the player to wager on games played on the gaming machine 12.

The bill acceptor 142 includes an input and output device that is configured to accept a bill, a ticket, and/or a cash card into the bill acceptor 142 to enable an amount of gaming credits associated with a monetary value of the bills, ticket, and/or cash card to be credited to the gaming machine 12. Moreover, the gaming machine 12 may also utilize a cashless wagering system (not shown), such as a ticket in ticket out (TITO) system (not shown). In one embodiment, the bill acceptor 142 also includes a printer (not shown) that is configured to dispense a printed voucher ticket that includes information indicative of an amount of credits and/or money paid out to the player by the gaming machine 12 during a gaming session. The voucher ticket may be used at other gaming machines, or redeemed for cash, and/or other items as part of a casino cashless system (not shown).

The coin tray 143 is coupled to the cabinet assembly 136 and is configured to receive a plurality of coins that are dispensed from the gaming machine 12. One or more speakers 144 are installed inside the cabinet assembly 136 to generate voice announcements and/or sound effects associated with game play. The gaming machine 12 also includes one or more lighting devices 146 that are configured to blink and/or change brightness and color in specific patterns to produce lighting effects to enhance a visual gaming experience for the player.

In one embodiment, the input buttons 138 include a plurality of BET switches 148 for inputting a wager on a game, a plurality of selection switches 150 for selecting a betting line and/or card, a MAXBET switch 152 for inputting a maximum wager, a PAYOUT switch 154 for ending a gaming session and dispensing accumulated gaming credits to the player, and a start switch, i.e., a SPIN/DEAL button 156 to initiate an output of a game.

In the illustrated embodiment, the BET switches include five switches from 1BET to 5BET to enable a player to wager between a minimum bet up to 5× minimum bet. Each selection switch corresponds to a betting line such as, for example, a payline and/or symbol for a reel game, one or more cards for a card game, and/or a symbol for a roulette game, to enable a player to associate a wager with one or more betting lines. The MAXBET switch enables a player to input the maximum bet that a player can spend against one play of a game. The PAYOUT switch enables a player to receive the amount of money and/or credits awarded to the player during a gaming session, which has been credited onto the gaming machine 12.

The gaming machine 12 may also include the player tracking terminal 118 that is coupled to the gaming controller 56 and to the player gaming tracking device 22 for identifying the player and/or a player tracking account that is associated with the player. The player tracking account may include, but is not limited to, gaming credits available to the player for use in playing the gaming machine 12. The player tracking terminal 118 is configured to communicate player account information between the server computer system 20, the player gaming tracking device 22, and the gaming machine 12. For example, the player tracking terminal 118 may be used to track bonus points and/or credits awarded to the player during a gaming session and/or track bonus and/or credits downloaded to the gaming machine 12 from the server computer system 20.

In one embodiment, the player tracking terminal 118 is coupled to the gaming cabinet assembly 136 and includes the near field communication (NFC) reader 120, the data display 128, the player identification card reader 132, and the keypad 134. The NFC reader 120 is configured to accept proximity-based communication that may enable any suitable contactless proximity-based transactions or communications between the mobile computing device NFC component 25 and/or the NFC tag 26 and the EGM 12 and/or player tracking device 22. The NFC reader 120 may detect, read, or otherwise receive NFC communication from the mobile computing device 24 and/or the NFC enabled card, which may transmit information including the NFC ID to identify the player account information. The mobile computing device 24 may be within a certain distance or proximity to the NFC reader 120 in order to send and receive the NFC communications. After the NFC reader 120 receives the NFC communication from the mobile computing device 24 and/or NFC enabled card, the keypad 138 is configured to accept a user selection input such as, for example, a unique player personal identification number (PIN) to facilitate enabling the gaming machine 12 to identify the player, and access player account information associated with the identified player to be displayed on the data display 128. In one embodiment, the data display 128 includes a touchscreen panel 156 that includes the keypad 158. Alternatively, the data display 128 and the keypad 158 may be included in the gaming display 58.

In another embodiment, the NFC reader 120 may support a tap-on for the "card-in." The NFC reader 120 may receive from a NFC component 25 and/or NFC tag 26 the NFC ID which is then paired to the player account to log the player into SYNKROS. Illustrated in FIGS. 22-27, the NFC reader 120 includes a light 162 that may change colors depending on the action event data received (described herein). The NFC reader 120 also includes, but is not limited to, an antenna 164 that is in the center of the reader, a NFC reader ring 164 that may light up different colors, and a plastic Lexan over the black portion of NFC reader with either a character like a smiley face, the casinos' logo or even the SYNKROS logo provided it does not interfere with the NFC reader 120. When the mobile computing device 24 is within proximity to the NFC reader, and after a successful log-in, the NFC light 162 and/or NFC reader ring 166 may light up green shown in FIG. 22. If the log-in is unsuccessful the NFC light 162 and/or NFC reader ring 166 may light up red and the gaming display 58 may display a message such as, for example, "Please, insert your card again" or "Please try again" (shown in FIG. 23). In addition, if there is not a mobile computing device 24 within a predetermined proximity to the NFC reader 120, the NFC reader ring 166 may light up blue indicating that no card or NFC enabled device are within the area of the EGM 12 and/or player tracking device 22 (shown in FIG. 24). In another embodiment, shown in FIGS. 25-27, the NFC reader ring 166 may be a different light shape, depending on the placement of the NFC antenna and interference from the lighting.

In addition, once the player enters the PIN, the player may accept an award (anonymous Bonusing to a temporary account) and/or the player may enter a PIN to receive a preloaded NFC enabled card that includes cash for a cashless system (anonymous cashless wagering).

In one embodiment, the gaming display 58 includes a first display 168 and a second display 170. The first display 168 is configured to display the player interaction screen 80 including indicia and/or symbols for use in a game, e.g., cards used by a card game, roulette wheel and symbols used in a roulette game, and reels used in a reel game. The player interaction screen 80 may include any type of game including, but not limited to, a video slot game, a keno game, a blackjack game, a video poker game, or any type of game which allows a player to make a wager, play a game, and potentially provide the player an award based on an outcome of the game and a pay table. The player interaction screen 80 may also include a gaming area 172 and a player interaction area 174. The gaming area 172 is configured to display the game and the player interaction area 174 is configured to display a player interaction screen 80.

The second display 170 is configured to display game play instructions for performing the game including, but not limited to, playing instructions, pay tables, paylines, betting lines and/or any other information to enable the gaming machine 12 to function as described herein. Moreover, each display 168 and 170 may be configured to display at least a portion of the player interaction screen 80 and/or game play instructions. In one embodiment, the first and second displays 168 and 170 each include a flat panel display, such as a cathode ray tube display (CRT), a liquid crystal display (LCD), a light-emitting diode display (LED), a plasma display, and/or any suitable visual output device capable of displaying graphical data and/or text to a user. Alternatively, a single component, such as a touch screen, may function as both the gaming display 58 and as the user input device 60. In an alternative embodiment, the first display 168 and/or the second display 170 includes a plurality of mechanical reels displaying a plurality of game symbols.

Referring to FIG. 6, in one embodiment, the gaming controller 56 includes a processor, i.e., a central processing unit (CPU)174, a credit controller 176, a console unit 178, a payout controller 180, a random-number generator (RNG) 182, a lighting controller 184, a sound controller 186, a memory device 188, a database 190, and a display controller 192. The memory device 188 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 174 to store, retrieve, and/or execute instructions and/or data.

The CPU 174 executes various programs, and thereby controls other components of the gaming machine 12 according to player instructions and data accepted by the user input device 60 and/or the gaming display 58. The gaming controller 56 in particular executes a game program, and thereby conducts a game in accordance with the embodiments described herein. The memory device 188 stores programs and databases used by the gaming controller 56. Moreover, the memory device 188 stores and retrieves information in the database 190 including, but not limited to, a game type, a number of reels associated with a game, a number of symbol positions being displayed on each reel, a type of symbols being displayed on each symbol position, a predefined set of normal symbols, a predefined set of special symbols, image data for producing game images and/or screens on the gaming display 58, and temporarily stores variables, parameters, and the like that are used by the gaming controller 56. In addition, the memory device 188 stores indicia, symbol weights, pay tables, and/or winning combination tables which represent relationships between combinations of random numbers and types of awards. In one embodiment, the memory device 1881 utilizes RAM to temporarily store programs and data necessary for the progress of the game, and EPROM to store, in advance, programs and data for controlling basic operation of the gaming machine 12, such as the booting operation thereof.

The credit controller 176 manages the amount of player's credits, which is equivalent to the amount of coins and bills counted and validated by the bill acceptor 142. The console unit 178 is coupled to the user input device 60 to monitor player selections received through the input buttons 138, and accept various instructions and data that a player enters through the input buttons 138. The payout controller 180 converts a player's credits to coins, bills, or other monetary data by using the coin tray 143 and/or for use in dispensing a credit voucher via the bill acceptor 142.

The lighting controller 184 controls one or more lighting devices 146 to blink and/or change brightness and color in specific patterns in order to produce lighting effects associated with game play. The sound controller 186 controls the speakers 144 to output voice announcements and sound effects during game play.

The RNG 182 generates and outputs random numbers to the gaming controller 56 preferably at the start of each round of a game. The gaming controller 56 uses the random numbers to determine an outcome of the game. For example, if the game is a video slot game, the gaming controller 56 uses the RNG 182 to randomly select an arrangement of symbols to be displayed on video reels. Moreover, the gaming controller 56 generally uses random numbers generated by the RNG 182 to play the games and to determine whether or not to provide an award to a player. In addition, the gaming controller 56 generates game outcomes including combinations of random numbers, and compares the generated combinations with winning combinations stored in the winning combination table to determine if the generated outcome is a winning outcome that is associated with a type of award.

The display controller 192 controls the gaming display 58 to display various images on screens preferably by using computer graphics and image data stored in the memory device 188. More specifically, the display controller 192 controls video reels in a game screen displayed on the first display 168 and/or the second display 170 by using computer graphics and the image data. The display controller 192 is connected to the display device 74 for receiving image data indicative of the player interaction screen 80 for use in displaying the player interaction screen 80 on the gaming display 58. In one embodiment, the display device 74 may be configured to perform the function and operation of the display controller 192 and may be housed within the gaming cabinet assembly 136 of the gaming machine 12. Moreover, the display device 74 may be connected directly to the gaming display 58 to control the gaming display 58 to display various images on screens preferably by using computer graphics and image data stored in the memory device 188.

In another embodiment, the user may interact with the player account server 52 to manage a current player account 194 via a player tracking ID 196 or sign-up and receive a temporary player ID 198 to enable the player to communicate with the EGM 12. Once the temporary player ID 198 is associated with a player account 194, the player may manage the player account 194 and communicate with the EGM 12 and/or player tracking device 22 via NFC communication.

Figure 9:
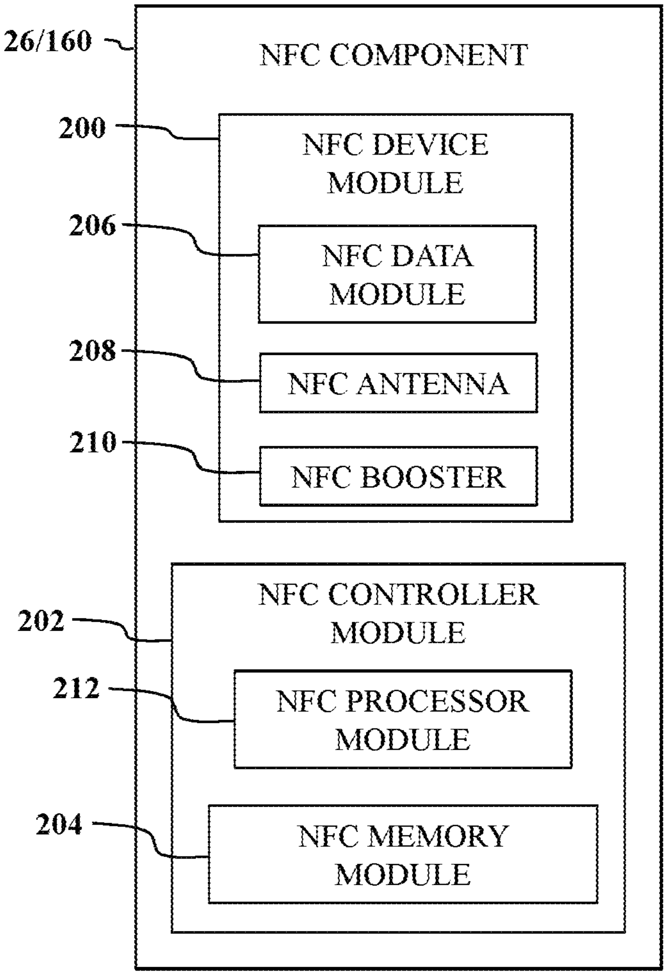
FIGS. 9 and 10 are illustrations of schematic components of the system shown in FIGS. 1-4, according to the embodiment of the present invention.
Figure 10:
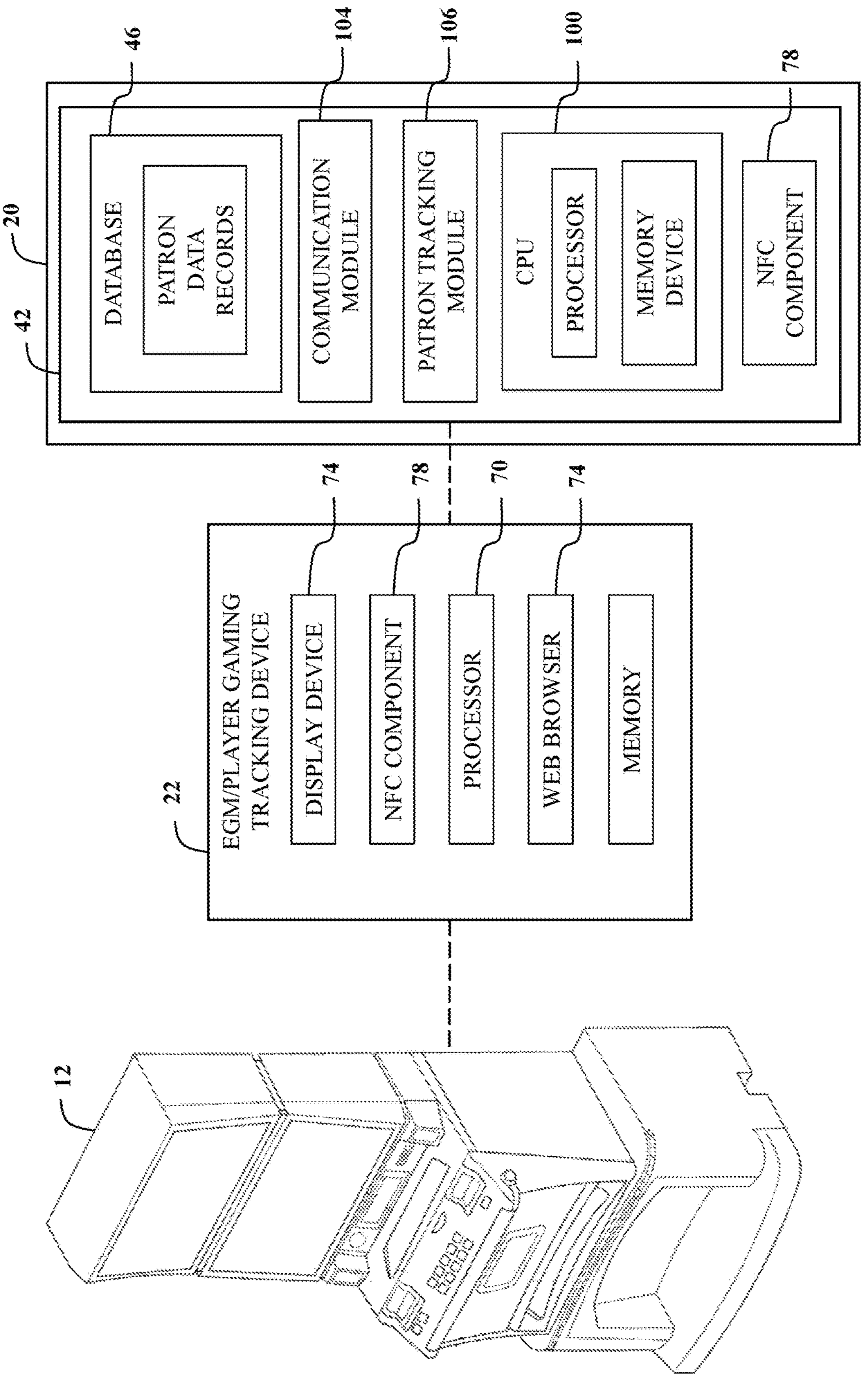
Figure 17:
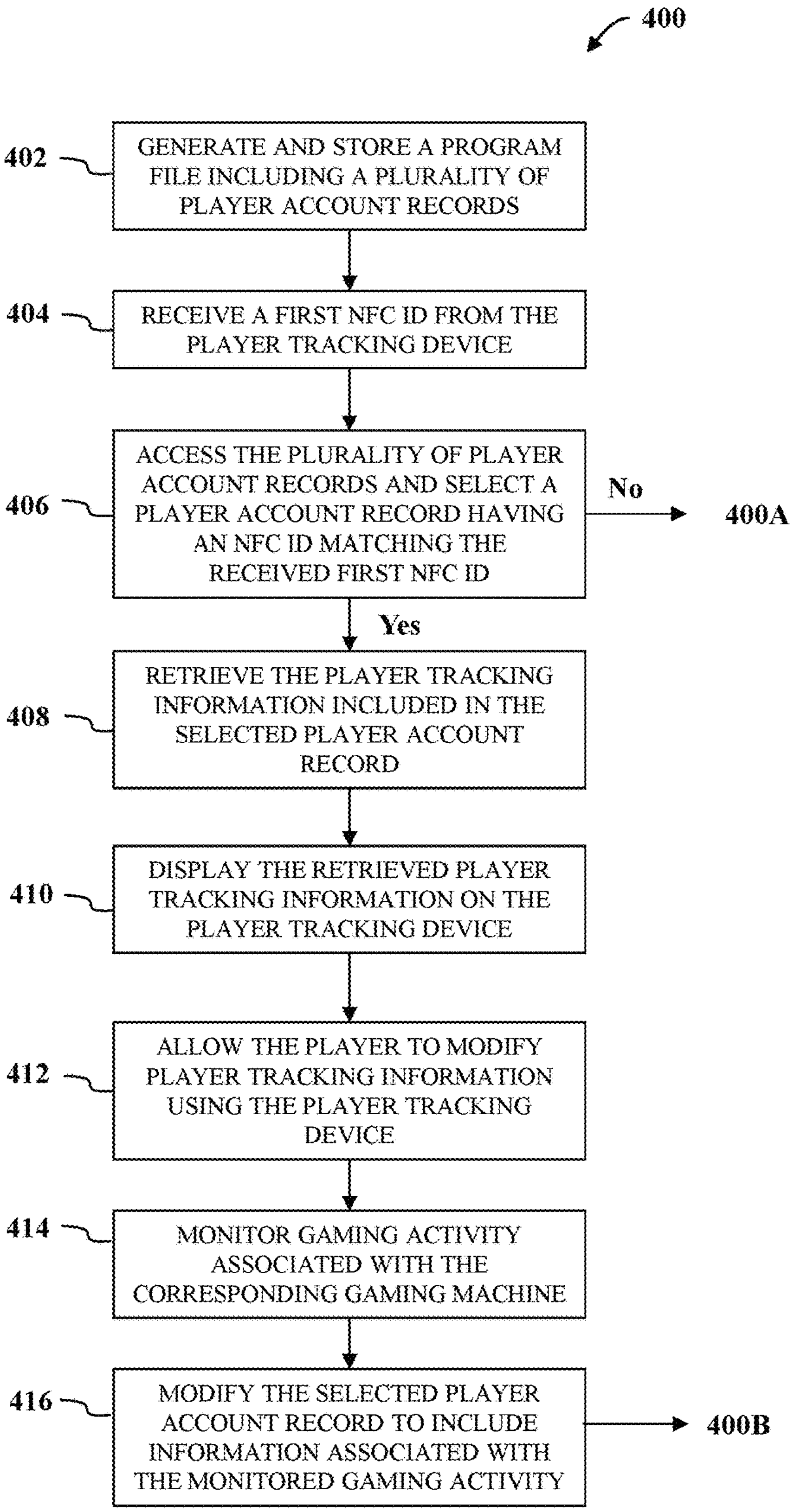
FIGS. 17-21 are flowcharts of a method that may be used with the system shown in FIGS. 1-4 for providing gaming property services to a player, according to an embodiment of the present invention.
Figure 18:
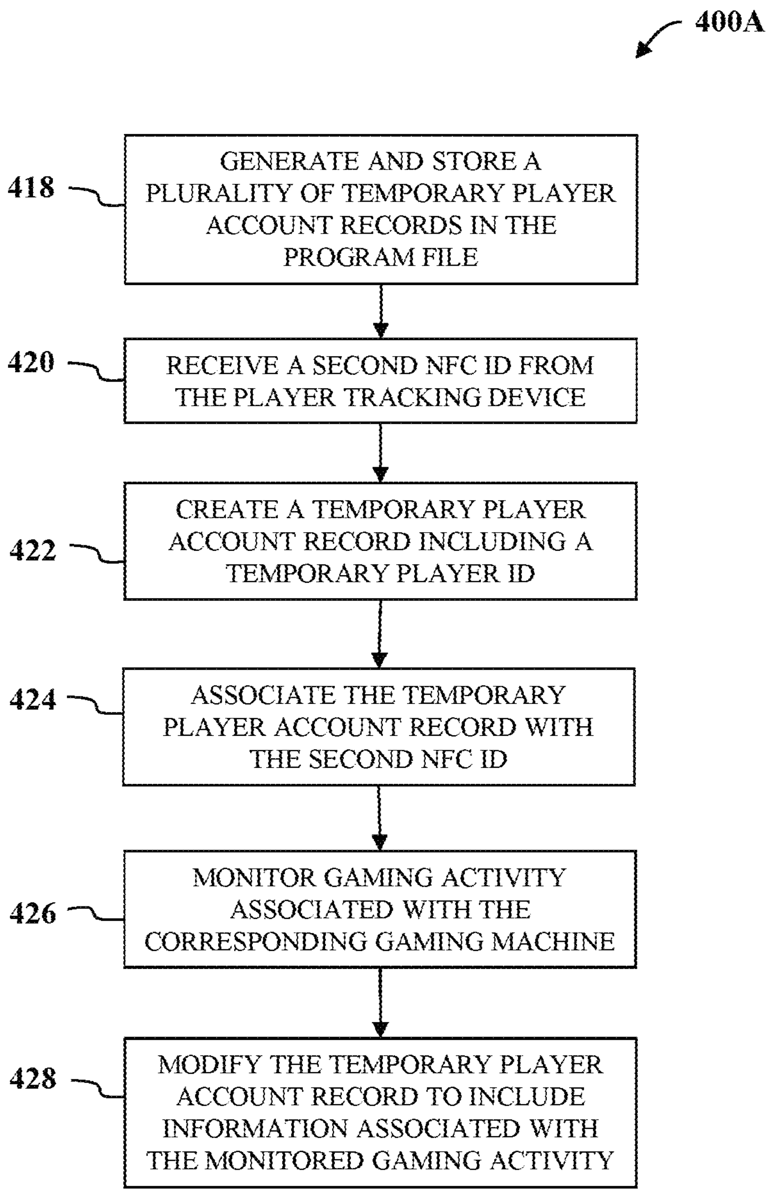
Figure 19:
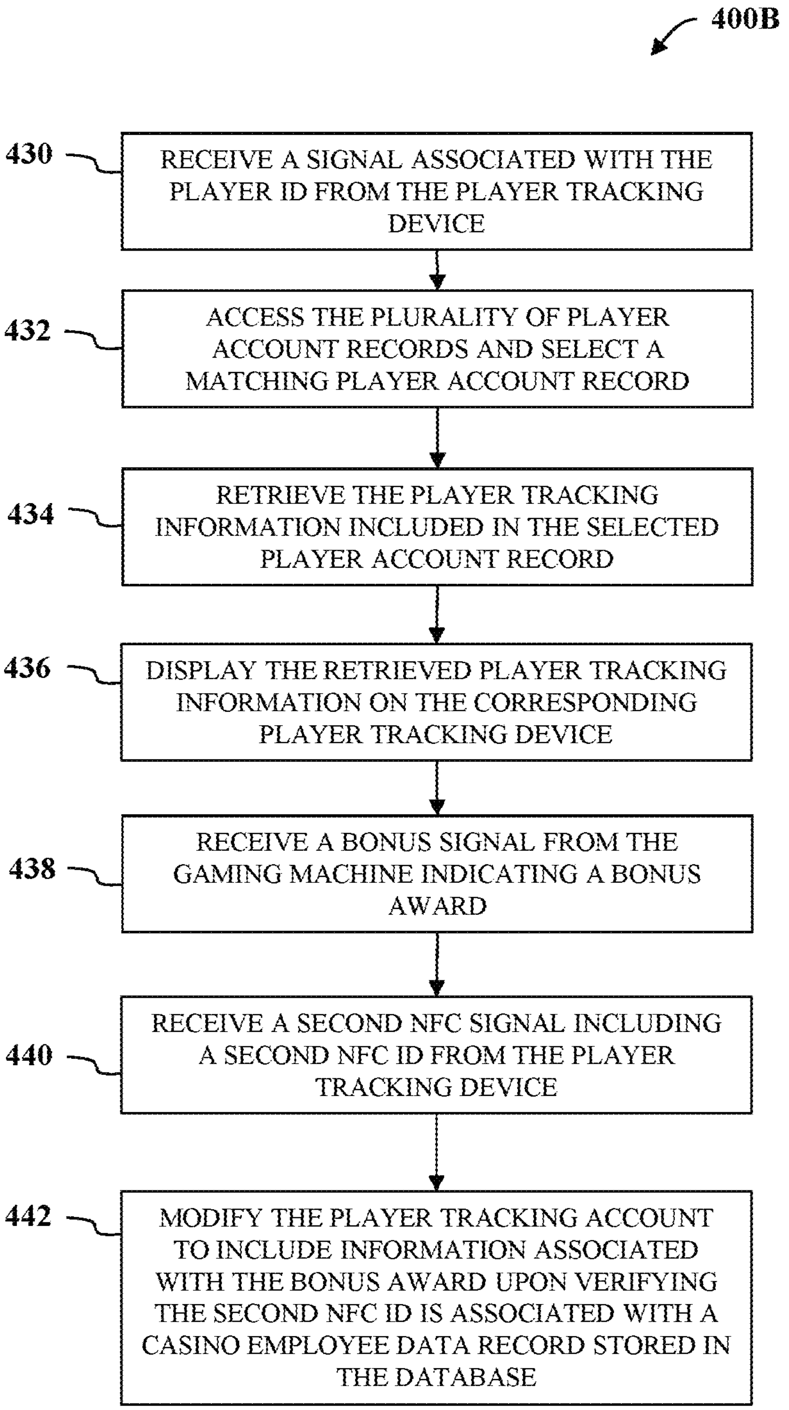
Figure 20:
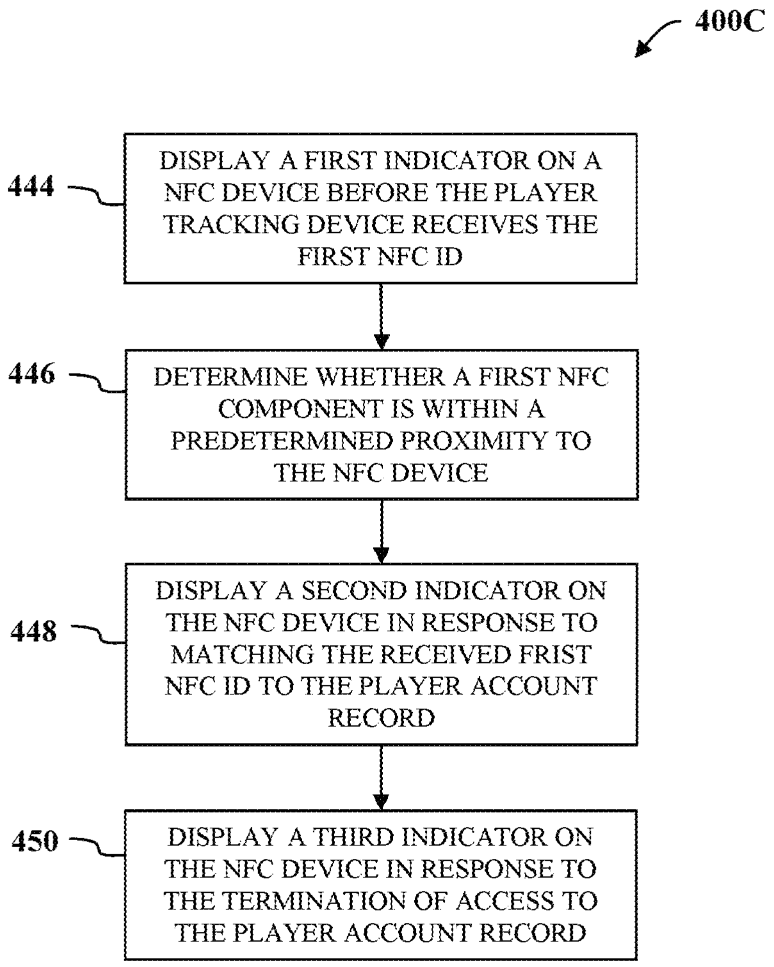

The NFC component 25 of the mobile computing device 24 and the NFC tag 26 may include a plurality of modules for enabling contactless proximity-based communication between the mobile computing device 24 and the gaming device 12 and/or player gaming tracking device 22. As shown in FIG. 9, for example, the NFC component 25 and the NFC tag 26 may include an NFC device module 200, an NFC controller module 202, and an NFC memory module 204. In addition, the NFC device module 200 may include an NFC data module 206, an NFC antenna 208, and an NFC booster 210. The NFC data module 206 may be configured to contain, route, or otherwise provide any suitable data that may be transmitted by the NFC component 25 and the NFC tag 26 to the gaming device 12 via the NFC reader 120 as part of a contactless proximity-based or NFC communication. Additionally, the NFC data module 206 may be configured to contain, route, or otherwise receive any suitable data that may be received by the NFC component 25 from the gaming device 12 and/or player tracking device 22 as part of a contactless proximity-based communication. For example, the NFC component 25 and NFC tag 26 may send the NFC ID to the player tracking device 22 and the server computer system 20 may pair the NFC ID to the player tracking ID 196 via NFC communication to the NFC reader 120 of the gaming device 12 and/or player tracking device 22 to log the player into the gaming device 12. The server computer system 20 may then send the player tracking ID 196 to the database 46 to be associated with a player account 194.

In another embodiment, the NFC transceiver or NFC antenna 208 may be any suitable antenna or other suitable transceiver circuitry that may generally enable communication or NFC communication from the NFC data module 206 to the player gaming tracking device 22 and/or to the NFC data module 206 from the player gaming tracking device 22. Overall, the NFC antenna 208 (e.g., a loop antenna) may be provided specifically for enabling the contactless proximity-based communication capabilities of the NFC component 25 and the NFC tag 26.

In one embodiment, the NFC component 25 may utilize the same transceiver circuitry or antenna 208 that another communication component may utilize of the mobile computing device 24. For example, the communication component 124 may leverage the antenna 208 to enable Wi-Fi, Bluetooth™, cellular, or GPS communication between the mobile computing device 24 and another remote entity, while the NFC component 25 may leverage the antenna 208 to enable contactless proximity-based or NFC communication between the NFC data module 206 of the NFC device module 200 and another entity (e.g., gaming device 12, player gaming tracking device 22). In another embodiment, the NFC device module 200 may include the NFC booster 210, which may be configured to provide appropriate signal amplification for data of the NFC component 25 (e.g., data within NFC data module 206) so that such data may be appropriately transmitted by the shared antenna 208 as NFC communication to the gaming machine 12 and/or player gaming tracking device 22. For example, the shared antenna 208 may require amplification from the booster 210 before the antenna 208 (e.g., a non-loop antenna) may be properly enabled for communicating contactless proximity-based or NFC communication between the mobile computing device 24 and the gaming machine 12 and/or player gaming tracking device 22 (e.g., more power may be needed to transmit the NFC data using the antenna 208 than may be needed to transmit other types of data using the antenna 208).

The NFC controller module 202 may include at least one NFC processor module 212. The NFC processor module 212 may operate in conjunction with the NFC device module 200 to enable, activate, allow, and/or otherwise control the NFC component 25 and the NFC tag 26 for communicating the NFC communication between the mobile computing device 24 and the gaming machine 12 and/or player gaming tracking device 22. The NFC processor module 212 may exist as a separate component, may be integrated into another chipset, or may be integrated with the processor, for example, as part of a system on a chip ("SoC"), for example on a NFC enabled card. The NFC controller module 202 may include one or more protocols, such as the Near Field Communication Interface and Protocols ("NFCIP-1"), for communicating with another NFC device (e.g., gaming machine 12 and/or player gaming tracking device 22). The protocols may be used to adapt the communication speed and to designate one of the connected devices as the initiator device that controls the near field communication.

The NFC controller module 202 may control the near field communication mode of the NFC component 25 and the NFC tag 26. For example, the NFC processor module 212 may be configured to switch the NFC device module 200 between a reader/writer mode for reading information (e.g., communication) from NFC components 25 and/or NFC tags 26 (e.g., from the gaming machine 12 and/or player gaming tracking device 22) to the NFC data module 206, a peer-to-peer mode for exchanging data (e.g., NFC communication) with another NFC enabled device (e.g., mobile computing device 24), and a card simulation mode for allowing another NFC enabled device (e.g., player card including a NFC tag 26) to send information (e.g., NFC communication) from the NFC data module 206. The NFC controller module 202 also may be configured to switch the NFC component 25 between active and passive modes. For example, the NFC processor module 212 may be configured to switch the NFC device module 200 between an active mode where the NFC device module 200 may generate its own NFC communication and a passive mode where the NFC device module 200 may transfer data to another device generating the NFC communication. The modes of the NFC device module 200 may be controlled by the user and/or based on the manufacturer of the device (e.g., iPhones™). For example, the NFC tag 26 sends NFC communication in a passive mode because the NFC tag 26 does not receive any information. In contrast, the NFC component 25 may utilize both the passive and active made by sending and receiving NFC communication.

The NFC memory module 204 may operate in conjunction with the NFC device module 200 and/or the NFC controller module 202 to allow for NFC communication between the mobile computing device 24 and the gaming machine 12 and/or player gaming tracking device 22. The NFC memory module 204 may be embedded within the NFC device hardware or within an NFC integrated circuit ("IC"). In addition, the NFC memory module 204 may be tamper resistant and may provide at least a portion of a secure element. For example, the secure element may be configured to prompt the player to enter a PIN after receiving the NFC communication from the mobile computing device 24. Therefore, requiring a two-step method for a player to log into the gaming machine 12 and/or player gaming tracking device 22.

In another embodiment, the NFC reader 120 may allow for close range communication at relatively low rates (e.g., 424 kbps), and may comply with any suitable standards such as ISO/IEC 7816, ISO/IEC 18092, ECMA-340, ISO/IEC 21481, ECMA-352, ISO 14443, and/or ISO 15693. Additionally, the NFC reader 120 may allow for close range communication at relatively high data rates (e.g., 370 Mbps), and may comply with any suitable standards, such as the TransferJet™ protocol. Communication between the NFC reader 120 and the mobile computing device 24 and/or the NFC enabled card may occur within any suitable close range distance between the mobile computing device 24 and the gaming machine 12 and/or player gaming tracking device 22, such as a range of approximately 2 to 4 centimeters, and may operate at any suitable frequency (e.g., 13.56 MHz). For example, such close range communication of the NFC reader 120 may take place via magnetic field induction, which may allow the NFC reader 120 to communicate with other NFC devices and/or to retrieve information from player tracking ID(s) having radio frequency identification ("RFD") circuitry. The NFC reader 120 may also provide a way of logging into the gaming machine 12 and/or player gaming tracking device 22, logging out of the gaming machine 12 and/or player gaming tracking device 22, and otherwise communicating with an external device (e.g., NFC component 25 of the mobile computing device 24).

The NFC communication between the gaming machine 12 and/or player gaming tracking device 22 and the mobile computing device 24 may occur wirelessly and may not require a clear line of sight between the respective devices. The NFC communication may be passive 214 or active 216. When passive, the NFC communication may only be activated when the mobile computing device 214 is within a response range 218 of the NFC reader 120 on the gaming machine 12 and/or player gaming tracking device 22. For example, the NFC reader 120 of the gaming device 12 may emit a relatively low power radio wave field that may be used to power an antenna utilized by the NFC device module 200 and enable that antenna to transmit suitable NFC communication information from the NFC data module 206 of the mobile computing device 24, via the antenna 208 to the NFC reader 120 on the gaming device 12. When active, the NFC device module 200 may incorporate or otherwise have access to a power source local to the mobile computing device 24 that may enable a shared antenna 208 or NFC specific antenna to actively transmit NFC communication information from the NFC data module 206, via the antenna 208 to the NFC reader 120 of the gaming machine 12 and/or player gaming tracking device 22 as NFC communication, rather than reflect radio frequency signals, as in the case of a passive NFC communication 214.

In another embodiment, the NFC reader 120 of the gaming machine 12 may include a NFC component 160 the same as or similar to the NFC component 25 of the mobile computing device 24 and/or the NFC component 78 of the player gaming tracking device 22 to send and receive NFC communication. In addition, the NFC component 25 may be included in a "tag" or a sticker or on a specific NFC enabled card.

In another embodiment, once the player is done playing and/or using the gaming machine 12 and/or player gaming tracking device 22, the player may log out or tap-out of the gaming machine 12 and/or player gaming tracking device 22 by tapping the NFC component 25 and/or NFC tag 26 within the proximity to the NFC reader 120. The player may be logged off SYNKROS and the resulting uncarded or attract screen will again be shown (shown in FIGS. 23 and 26, the blue NFC reader 120). In addition, the player tracking terminal 118 may include a log-off function where if there are no credits on the game after a predetermined amount of time, for example, 30 seconds to 1 minute of inactivity. If there are no credits on the game, the player may be automatically logged off, and the screen may return to the NFC reader 120 with the appropriate NFC light 162, i.e. blue, around the NFC reader 120. The existing abandoning method may be used for the NFC component 25 and/or NFC tag 26 time-out logic if the conditions for the abandoned card timer are reached, then a force card-out and return to the TTD/TTW screen may be displayed to attract new players to the gaming machine 12 and/or player gaming tracking device 22.

In another embodiment, the player interaction screen 80 includes a log-off button for the player to hit in order to log-out of the player tracking account. In addition, the NFC reader 120 may include a motion detector, camera, and/or range/proximity capability to determine whether the NFC component 25 and/or NFC tag 26 of the mobile computing device 24 is still within proximity to the NFC reader 120. Once the NFC component 25 and/or NFC tag 26 is no longer within proximity to the NFC reader 120, the player tracking ID 196 may be logged-off or signed-off the gaming machine 12 and/or player gaming tracking device 22. Once the player is logged-off, the server computer system 20 may receive all of the player gaming activity to be saved in the player account on the database 46.

In one embodiment, the player may use a mobile application to sign up and receive the temporary player tracking ID 198. The player may use the temporary player tracking ID 198 to track the gaming data on the gaming machine 12 and/or player gaming tracking device 22. The player may visit the player's club or a casino host to confirm the player identity, determine whether they meet the casino age requirement, and are not self-barred/casino-barred, and then convert the temporary account 198 into a SYNKROS account 194 including all temporary play and base point accruals on the previously tracked activity. In addition, the possible methods to sign up for the temporary user account 198 include but are not limited to a URL (website), a downloaded application, and/or any other method to receive a temporary player account. If the player is already in proximity to the NFC reader 120, the mobile computing device 24 may receive a request to sign-up as a temporary member. The player gaming tracking device 22 may communicate to the database 46 to create the temporary player tracking ID 198 for the player and the player may then follow up to verify the account as described above. The player gaming tracking device 22 may send all of the data received to the server computer system 20 to create the temporary player account and pair the NFC ID 26 with the newly created temporary player account 198. In addition, the player may enter the information on the True-Time Display (Picture-in-Picture), but would still have to verify the player tracking ID and account information to create a permanent player account.

While the NFC component 25/78/160 and NFC tag 26 have been described with respect to near field communication, it is to be understood that the NFC component 25/78/160 and NFC tag 26 may be configured to provide any suitable contactless proximity-based mobile log-in/log-out or any other suitable type of contactless proximity-based communication between the mobile computing device 24 and the gaming machine 12 and/or player gaming tracking device 22. For example, the NFC component 25/78/160 and NFC tag 26 may be configured to provide any suitable short-range communication, such as those involving electromagnetic/electrostatic coupling technologies.

In another embodiment, the system 10 may develop a plugin for phones, i.e. Android™, to allow a player to add their SYNKROS card number 196 to the existing phone to broadcast the player tracking ID 196 using the phone's NFC component 25 and to be used to tap-in/tap-off versus an NFC encoded card. The plugin may be provided by the 3rd party services system 16. The 3rd party services system 16 includes the plugin in the player mobile application to allow the phone to act like a NFC encoded card. In addition, some mobile computing devices 24 may not be capable of plugging into the NFC component 25 of the device 24 and the player tracking ID 196 may correspond to an NFC component 25 on a NFC enabled card or a sticker (tag) 26, as shown in FIG. 7. The NFC enabled cards may include a NFC tag 26 that is the same as or similar to the NFC component 25 of the mobile computing device 24.

In the illustrated embodiment, the system 10 is configured d to transmit data indicative of the player interaction screen 80 to the gaming device 12 to enable the player to access the server computer system 20, the entertaining management and monitoring system 14, and/or the 3rd party service system 16 via the gaming device 12. The system 10 is configured to display the player interaction screen 80 including a web browser that enables the player to interact with the systems 14, 16, and 20 through a web interface. In the illustrated embodiment, the gaming device 12 is configured to simultaneously display a game and the player interaction screen 80 on the gaming device 12 to enable the player to play the game and to purchase goods and services, and/or access player account information via the gaming device 12.

The system 10 includes embedded software that runs on the SYNK Box, e.g., player gaming tracking device 22, and includes a generic touch screen enabled web browser (similar to Internet Explorer). When configured with True Time Display hardware (Picture-in-Picture on the gaming device 12), a side panel can be used to establish a touch screen enabled web browser session to the casino web server 50.

Referring to FIG. 1, the embedded web browser 76 establishes a connection to the casino web server 50. As part of the URL request, the SYNKROS Player ID, as well as the SYNKROS gaming device ID of the gaming device 12, that the player is playing is sent.

In another embodiment, Atrient (or another Kiosk vendor) is configured to provide a plurality of functions including, producing compatible NFC enabled cards for player enrollment, sending the NFC component 25 with a NFC ID that is associated with a player tracking ID 196 via the SYNKROS service bus to enroll the player, and/or allowing access to update the fields that control club membership via the SYNKROS service bus. In addition, the SYNKROS service bus may be configured to accept creations and updates to the club membership fields stored in Illustrated in FIGS. 11-16, the patron tracking module 106 is configured to receive player tracking information from one or more player gaming tracking devices 22 and generate player tracking accounts for use in storing the information received from the player gaming tracking devices 22. For example, in one embodiment, the patron tracking module 106 is configured to generate and store a plurality of player tracking account records 220 (shown in FIG. 11) in the database 46. Each player tracking account record 220 includes a player account number 222 associated with a casino patron, a patron name, a birthdate, a unique player tracking ID 196, a NFC ID 224 that is associated with the unique player tracking ID 196, address information associated with the casino patron including a corresponding postal code, a personal identification number (PIN) 226 associated with the player tracking ID 196 to allow access to the player account 220, and a priority level 228 associated with the amount of access to the system 10 the player is allowed. Each player tracking account record 220 also includes player tracking data that includes information on the amount of wagers and type of games being played by the patron and/or an amount of goods and/or services being purchased by the patron. For example, shown in FIG. 13, each player tracking account record 220 may include one or more patron transaction records 230. Each patron transaction record is associated with a transaction being made by the corresponding patron. Each patron transaction record may include information that indicates a transaction being made by the patron such as, for example, a purchase being made at a POS terminal associated with the casino, an amount of wagers being placed with a slot machine, and/or an amount of wagers being placed at a table game.

In another embodiment, the patron tracking module 106 is configured to generate and store a plurality of temporary player tracking account records 232 (shown in FIG. 12) in the database 46. Each temporary player tracking account record 232 includes a player account number 234 associated a unique temporary player tracking ID 198, a NFC ID 236 that is associated with the unique temporary player tracking ID 198, a personal identification number (PIN) 238 associated with the temporary player tracking ID 198, and a priority level 240 associated with the amount of access to the system 10 the temporary player is allowed. Each temporary player tracking account record 232 also includes player tracking data that includes information on the amount of wagers and type of games being played by the patron and/or an amount of goods and/or services being purchased by the patron. For example, shown in FIG. 14, each temporary player tracking account record 232 may include one or more patron transaction records 230. Each patron transaction record is associated with a transaction being made by the corresponding patron. Each patron transaction record may include information that indicates a transaction being made by the patron such as, for example, a purchase being made at a POS terminal associated with the casino, an amount of wagers being placed with a slot machine, and/or an amount of wagers being placed at a table game. The player and temporary player may enter their PIN to redeem free play, download CWA fund, etc.

During operation, the patron may enter player information at a player gaming tracking device 22 associated with a gaming machine 12 to initiate a gaming session to begin placing wagers on the games being provided by the gaming machine 12. For example, in one embodiment, the patron may log into the player gaming tracking device 22 by being in a predetermined proximity to the NFC reader 120 with a blue light indicating an available gaming machine 12. Once the NFC reader 120 receives the NFC communication and/or NFC component 25 including the NFC ID 224/236 from the mobile computing device 24, the player gaming tracking device 22 determines the player tracking ID 196/198 associated with the NFC ID 224/236 received from the NFC communication. The system 10 then requests from the patron the corresponding PIN 226/238. The patron may be triggered to enter the corresponding PIN 226/238 in order to securely access the associated player account 220. Once the player gaming tracking device 22 has received a correct PIN corresponding to the player tracking ID 196/198, the patron may receive access to the player account 220 associated with the player tracking ID 196/198. In another embodiment, the player may initiate a gaming session at a gaming table, and allow a casino employee to enter player information into a player gaming tracking device 22 and/or mobile computing device 24 associated with the gaming table. In addition, while the patron is still logged into the player gaming tracking device 22, the employee may be able to use an employee tracking ID 242 (also known as player tracking ID) to be read by the NFC reader 120 and override the patron using the gaming machine due to the employee tracking ID 242 having a higher priority level than the player playing the game. While the employee is logged-in to the gaming device 12, the employee is able to perform functions while the player is still logged into the gaming device 12. The players' play may be paused or continued while the employee is currently logged into the same gaming device 12.

Upon receiving the player information, the patron tracking module 106 may access the database 46 to identify and retrieve a player tracking account record 220 associated with the player information including the unique player tracking ID 196. The patron tracking module 106 may then generate the patron transaction record 230 including information associated with the gaming session including, but not limited to, a unique session ID 244, a date of the gaming session, a start time, and a game type (shown in FIG. 13). Upon completion of the gaming session, the player gaming tracking device 22 and/or patron tracking module 106 receives information associated with amount of wagers being placed by the player during the gaming session and updates the patron transaction record 230 to include an end time to the gaming session, and a total amount of wagers being placed. In addition, the patron tracking module 106 may access the database 46 to identify and retrieve a temporary player tracking account record 232 associated with the player information including the temporarily player tracking ID 198. The patron tracking module 106 may then generate the patron transaction record 230 including information associated with the gaming session including, but not limited to, the unique session ID 244, a date of the gaming session, a start time, and a game type (shown in FIG. 14). Upon completion of the gaming session, the player gaming tracking device 22 and/or patron tracking module 106 receives information associated with amount of wagers being placed by the player during the gaming session and updates the patron transaction record 230 to include an end time to the gaming session, and a total amount of wagers being placed.

In one embodiment, the database 46 may also include an action event record list 246 (shown in FIG. 15) that includes a plurality of action event records 248. Each action event record 248 may include a triggering event 250, action event data 252, and the action event 254. The system 10 may initiate the action event 254 once the action event is triggered by the triggering event 250. Once the action event is triggered, the player gaming tracking device 22 may transmit the action event 254. For example, if the NFC reader 120 receives a player tracking ID 196 from a NFC component 25, the player gaming tracking device 22 may request the corresponding player account 220 from the database 46. The player gaming tracking device 22 may be triggered to request from the player the corresponding PIN 226 that is associated with the player account 220 and the player tracking ID 196. Once the player gaming tracking device 22 has verified the PIN 226 with the player tracking ID 196, the player may receive access to the associated player account 220. Action event data 252 includes information and data including, but is not limited to, determining corresponding PIN(s) with player tracking ID(s), transmitting associated player accounts with successful log ins, and/or determining whether a second player/employee is allowed to access the gaming machine 12 and/or player tracking device 22 while a current player is logged into the gaming machine and/or player tracking device 22. As shown in FIG. 15, the action event data 252 description may include data associated with the corresponding action record. For example, in one embodiment, the action event data, Action004, allows a player tracking ID 196 access to the gaming machine 12 and/or player tracking device 22 while a different player is using the gaming machine 12 and/or player tracking device 22, as long as the second player ID has a higher priority level 228 than the current player priority level 228 that is logged in. The second player may be a gaming employee that is tracking data, awarding a jackpot, etc. The triggering events may include, but are not limited to, receiving a correct PIN, receiving a green light and or red light on the NFC reader 120, and/or receiving player tracking ID(s). Once the system 10 initiates the triggering event 250, the triggering event triggers the corresponding action event 254, which will send the action event data 252 to the corresponding server.

The database 46 may also include a player action record list 256 (shown in FIG. 16) that includes a plurality of player action records 258 that are associated with a plurality of players. Each player action record 258 includes the player transaction record 230 associated with the corresponding player tracking ID 196 or the temporary player tracking ID 198, the action record ID 248, the triggering event 250, the action event data 252, and the action event 254. In addition, the player action record 258 may also include information transmitted to the system 10 including data and information to be sent with by the player gaming tracking device 22 and/or the mobile computing device 24 associated with the corresponding player tracking ID 196/198 and/or API information associated with the corresponding mobile computing device 24.

In various embodiments, the system 10 includes plurality of gaming machines 12 and a server computer system 20. Each gaming machine includes a player tracking device 22 that includes a NFC device configured to receive NFC signals associated with unique NFC IDs. The server computer system 20 is coupled to each of the gaming machines 20 and includes a database server computer 94. The database server computer 94 includes a database server processor 96 coupled to a database memory device 98. The database server processor 96 is programmed to generate and store a program file including a plurality of player account records. The player account records include a unique player ID, player tracking information, and a unique NFC ID associated with a NFC component. An application server computer 92 is coupled to the database server computer 94 and to a plurality of gaming devices 12. The application server computer 92 includes an application processor 102 that is programmed to receive a first NFC ID from the player tracking device 22. The application processor 102 receives the first unique NFC ID 264 from the first NFC component 262 when the first NFC component 262 is within the predetermined proximity to the NFC reader 120. The application processor 102 then accesses the plurality of player account records and selects a player account record having an NFC ID matching the received first NFC ID. Then the application processor 102 will display the retrieved player tracking information on the corresponding player tracking device and allow the player to modify player tracking information using the player tracking device. The application processor 102 will monitor any gaming activity associated with the corresponding gaming machines and modify the selected player account record to include information associated with the monitored gaming activity. The application processor 102 may request a personal identification number (PIN) associated with the selected player account record before the application processor displays the retrieved player tracking information.

In another embodiment, the database server processor is programmed to generate and store a plurality of temporary player account records in the program file. Each temporary player account record includes a unique temporary player ID, player tracking information, and a unique NFC ID associated with a NFC component. The application processor 102 is programmed to receive a second NFC ID form the player tracking device and create a temporary player account record. The temporary player account record includes a temporary player ID upon determining the plurality of player account records does not include a player account record having an NFC ID matching the received second NFC ID. The application processor 102 is programmed to associate the temporary player account record with the second NFC ID and monitor gaming activity associated with the corresponding gaming machine. Once the temporary player is finished playing, the application processor 102 is programmed to modify the temporary player account record to include information associated with the monitored gaming activity. The temporary player tracking account is created until the temporary player can be verified, for example, appropriate age, not casino barred, etc.

In various embodiments, the application processor is programmed to terminate access to the player account once the NFC component is not within the predetermined proximity to the NFC device. In addition, the application processor is further programmed to terminate access to the player account once the gaming machine has not received any gaming activity for a predetermined period of time.

In another embodiment, the application processor 102 is programmed to receive a signal from the gaming machine 12 indicating a bonus award has been awarded. The application processor may then receive a second NFC signal including a second NFC ID from the player tracking device and modify the player tracking account to include information associated with the bonus award upon verifying the second NFC ID is associated with a casino employee data record stored in the database. The casino employee data record includes a higher priority over the first player allowing the casino employee to log-in over the first player.

In yet another embodiment, the player tracking device includes a card reader configured to receive a player tracking card having a unique player ID encoded on a magnetic strip. The application processor may receive a signal from the magnetic strip that is associated with the player ID from the player tracking device. The application processor 102 may then access the plurality of player account records and select a player account record having a player ID matching the received player ID and retrieve the player tracking information included in the selected player account record. Once the information has been retrieved, the player tracking information will be displayed on the corresponding player tracking device. The player may then receive a bonus signal from the gaming machine 12 indicating a bonus award. The application processor 102 may then receive a second NFC signal including a second NFC ID from the player tracking device and modify the player tracking account to include information associated with the bonus award upon verifying the second NFC ID is associated with a casino employee data record stored in the database.

Figure 22:
FIGS. 22-27 are graphical displays that may be displayed using the system shown in FIG. 1, according to an embodiment of the present invention.
Figure 23:
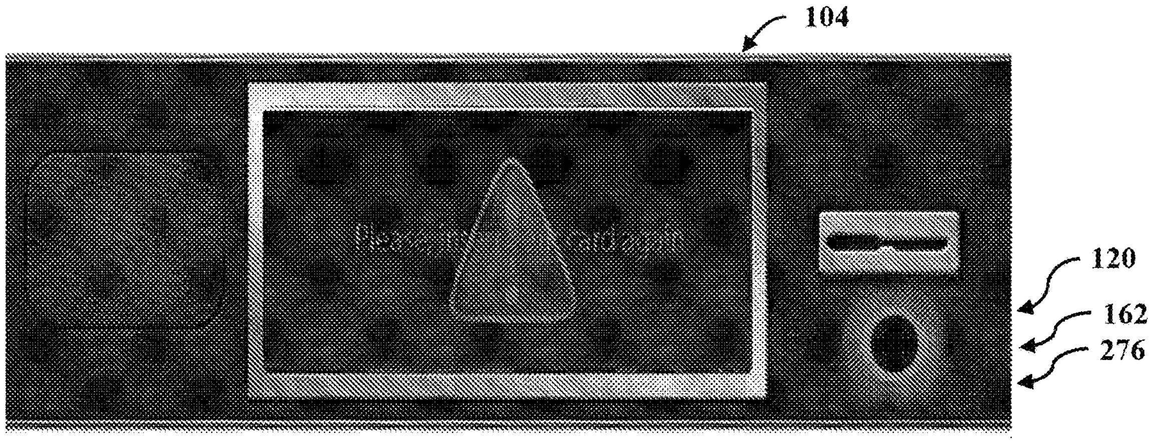
Figure 24:
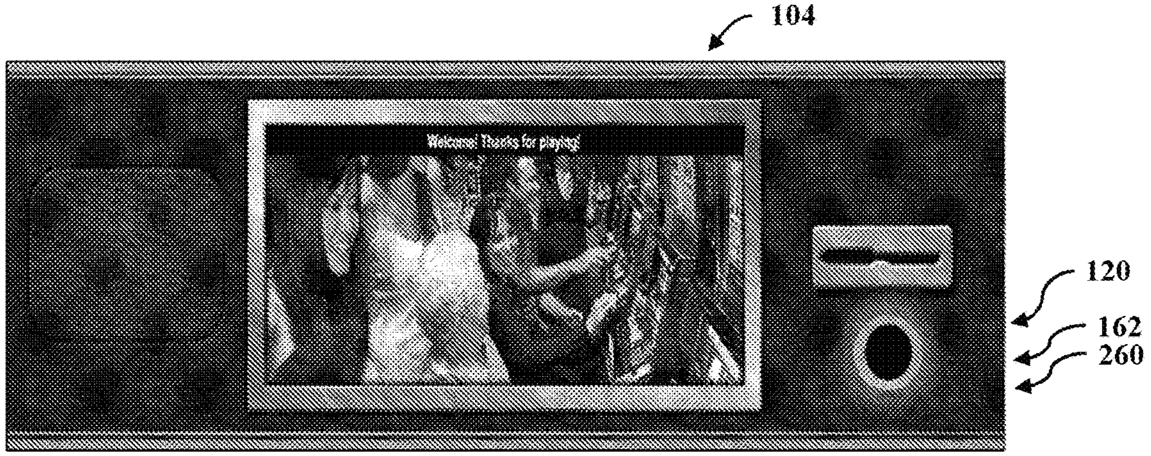
Figure 25:
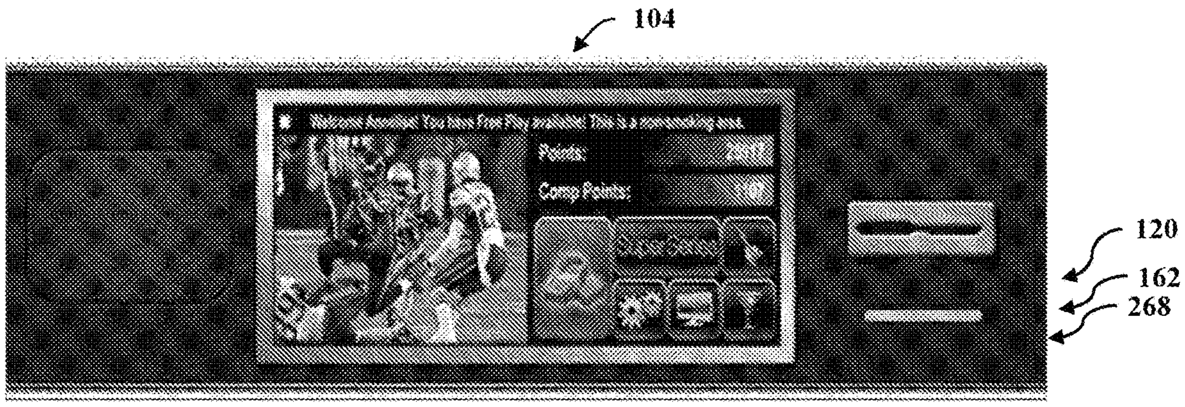
Figure 26:
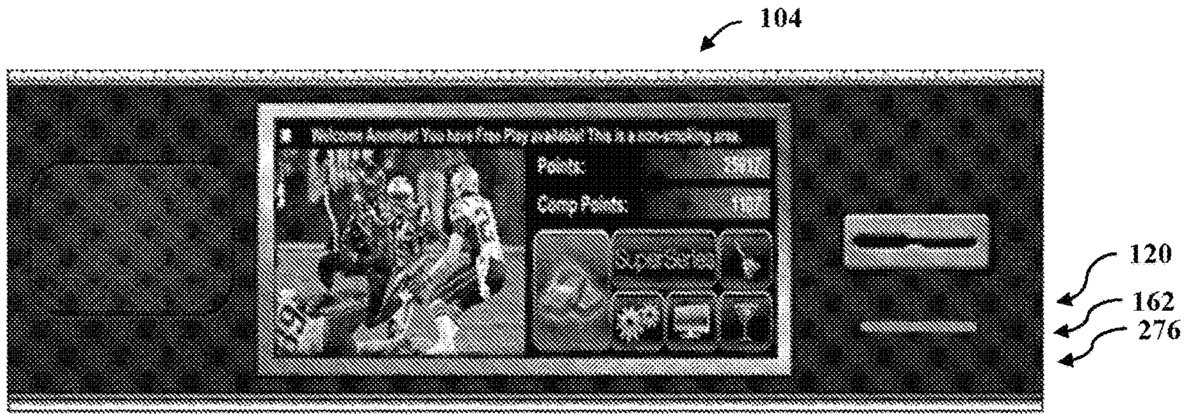
Figure 27:
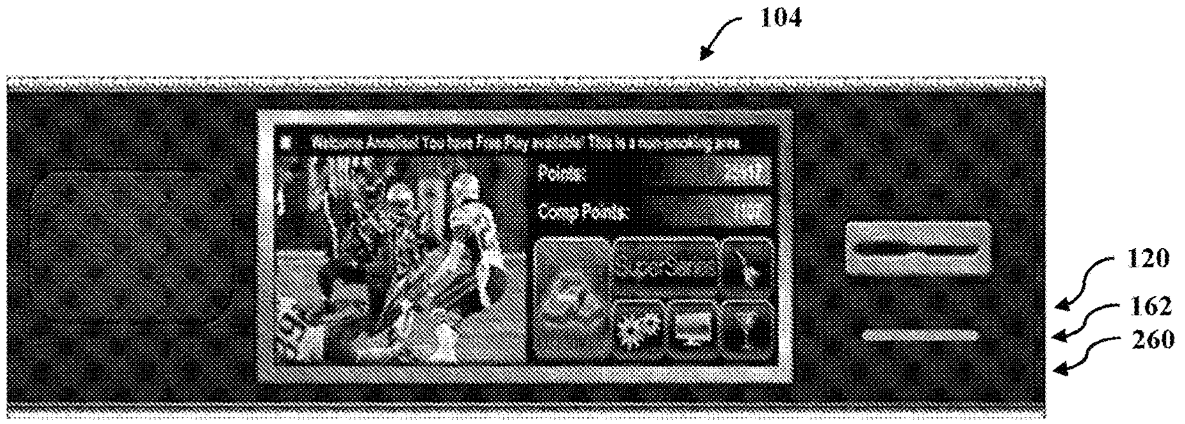

The application processor 102 may display a first indicator 260 on the NFC device before the player tracking device receives the first NFC ID. The first indicator 260 indicates when a first player is not logged into the gaming machine (as shown in FIGS. 24 and 27). The application processor 102 then determines whether a first NFC component 262 including the first NFC ID is within a predetermined proximity to the NFC device. The predetermined proximity may be any length where the NFC communication is able to be sent to and from the NFC device. Once the application processor matches the received first NFC ID to the player account record, a second indicator 268 is displayed on the NFC reader 120 (as shown in FIGS. 22 and 25). The second indicator 268 displays a successful log-in to the gaming device 12 by the first unique NFC ID 264. After the application processor 102 receives a successful log-in, the player tracking data associated with the first player tracking number 266 will be sent to the gaming machine 12. In addition, the application processor 102 is configured to display a third indicator 276 on the NFC device (as shown in FIGS. 23 and 26). The third indicator 276 indicates when the player is not successfully logged-into the gaming machine or in response to the termination of access to the player account record.

In addition, each player tracking number 196 and each temporary player tracking number 198 include a predetermined priority level. The priority level allows casino employees to log-in and the same time as a player to, for example, award a bonus. In various embodiments, the application processor 102 may continue to display the second indicator 268 on the NFC reader 120 while the first player tracking number 266 is logged-in to the gaming machine. Then the application processor 102 retrieves a first priority level 278 from the first player tracking number 266. The application processor 102 then determines whether a second NFC component 270 is within the predetermined proximity to the NFC reader 120. Once the second NFC component 270 is within the predetermined proximity, the application processor 102 receives a second unique NFC ID 272 from the second NFC component 270 within the predetermined proximity and determines whether the second unique NFC ID is associated with a second player tracking number. Then retrieves any player tracking data associated with the second player tracking number 274. The player tracking data includes a second priority level 280 where the second priority level is higher than the first priority level 278. In addition, the application processor 102 will log the second player tracking number 274 into the gaming machine 12 while the first player tracking number 266 is still logged-in to the gaming machine. For example, the second player tracking number 274 is associated with a casino employee and the employee will log-in to the gaming device 12 to award the first player tracking number 266 a bonus.

In yet another embodiment, the NFC component 25 sends the player ID from the device 24 (e.g., phone) to the NFC reader 120 in the player tracking device 22. The NFC reader 120 in the player tracking device 22, uses the NFC ID to lookup the player (or temporary player account). The NFC reader 120 reads the NFC tag 26 (card number) from the phone/app when it is close enough or in the predetermined proximity to the player tracking device 22. Once the signal is sent and the player uses the mobile app to set up the temporary membership, the temporary membership is converted into a permanent/SYNKROS membership. For example, during the lookup, if the NFC tag 26 (card number) is not found in SYNKROS, i.e., a new member, then the system 10 may ask the player if the player would like to sign up as a temporary member. The server computer system 20 (SYNKbox embedded hardware) may communicate to the database 46 to create a temporary player card for the player. The player then would need to go to the player club area to complete their membership and show a valid ID.

FIGS. 17-21 illustrate flowcharts of methods 400 and 500 that may be used with the host computer 42 for use in generating information that may be used to provide gaming property services to a casino patron. The method 400 includes a plurality of steps. Each method step may be performed independently of, or in combination with, other method steps. Portions of the method 400 may be performed by any one of, or any combination of, the components of the system 10.

In method step 402, the system 10 generates a program file including a plurality of player account records 106. The player account records 106 include a player account number 222, player tracking information, and a unique NFC ID 224. The unique NFC ID 224 is associated with a NFC component 25 or tag 26 and a player tracking number 196.

In method step 404, the system 10 receives a first NFC ID from the player tracking device. In method step 406, the system 10 accesses the plurality of player account records and select a player account record having an NFC ID matching the received first NFC ID. If the NFC ID does not have a matching player account record, the system 10 may create a temporary player account associated with the NFC ID (described in method 400A below). In method step 408, the system 10 retrieves the player tracking information included in the selected player account record. In method step 410, the system 10 displays the retrieved player tracking information on the corresponding player tracking device and in method step 412, the system 10 allows the player to modify player tracking information using the player tracking device.

In method step 414, the system 10 monitors gaming activity associated with the corresponding gaming machines, and in method step 416, the system 10 modifies the selected player account record to include information associated with the monitored gaming activity. Once the player is logged-in to the player tracking device 22, the system 10 may allow a second player to log in to the same player tracking device at the same time to, for example award a bonus (described below in method 400B).

Method 400A is a continuation of method 400. The method 400A includes a plurality of steps. Each method step may be performed independently of, or in combination with, other method steps. Portions of the method 400A may be performed by any one of, or any combination of, the components of the system 10.

In another embodiment, method step 418, the system 10 is programmed to generate and store a plurality of temporary player account records in the program file. Each temporary player account record includes a unique temporary player ID, player tracking information, and a unique NFC ID associated with a NFC component. In method step 420, the system 10 receives a second NFC ID from the player tracking device and in method step 422, the system 10 creates a temporary player account record. The temporary player account record includes a temporary player ID upon determining the plurality of player account records does not include a player account record having an NFC ID matching the received second NFC ID.

In method step 424, the system 10 associates the temporary player account record with the second NFC ID and in method step 426, the system 10 monitors the gaming activity associated with the corresponding gaming machine. Once the temporary player is finished playing, in method step 428, the system 10 modifies the temporary player account record to include information associated with the monitored gaming activity. The temporary player tracking account is created until the temporary player can be verified, for example, appropriate age, not casino barred, etc.

In various embodiments, the application processor is programmed to terminate access to the player account once the NFC component is not within the predetermined proximity to the NFC device. In addition, the application processor is further programmed to terminate access to the player account once the gaming machine has not received any gaming activity for a predetermined period of time.

In another embodiment, the system 10 receives a signal from the gaming machine 12 indicating a bonus award has been awarded. The application processor may then receive a second NFC signal including a second NFC ID from the player tracking device and modify the player tracking account to include information associated with the bonus award upon verifying the second NFC ID is associated with a casino employee data record stored in the database. The casino employee data record includes a higher priority over the first player allowing the casino employee to log-in over the first player.

Method 400B is a continuation of method 400. The method 400B includes a plurality of steps. Each method step may be performed independently of, or in combination with, other method steps. Portions of the method 400B may be performed by any one of, or any combination of, the components of the system 10.

In yet another embodiment, the player tracking device includes a card reader configured to receive a player tracking card having a unique player ID encoded on a magnetic strip. In method step 430, the system 10 receives a signal from the magnetic strip that is associated with the player ID from the player tracking device. In method step 432 the system 10 accesses the plurality of player account records and selects a player account record having a player ID matching the received player ID. In method step 434, the system 10 retrieves the player tracking information included in the selected player account record. Once the information has been retrieved, in method step 436, the system 10 will display the retrieved player tracking information on the corresponding player tracking device 22.

In method step 438, the system 10 receives a bonus signal from the gaming machine 12 indicating a bonus award, and in method step 440, the system 10 receives a second NFC signal including a second NFC ID from the player tracking device. In method step 442, the system 10 modifies the player tracking account to include information associated with the bonus award upon verifying the second NFC ID is associated with a casino employee data record stored in the database.

Method 400C is a continuation of method 400. The method 400B includes a plurality of steps. Each method step may be performed independently of, or in combination with, other method steps. Portions of the method 400B may be performed by any one of, or any combination of, the components of the system 10.

In method step 444, the system 10 displays a first indicator 260 on the NFC device before the player tracking device receives the first NFC ID. The first indicator 260 indicates when a first player is not logged into the gaming machine (as shown in FIGS. 24 and 27). In method step 446, the system 10 determines whether a first NFC component 262 including the first NFC ID is within a predetermined proximity to the NFC device. The predetermined proximity may be any length where the NFC communication is able to be sent to and from the NFC device. Once the system 10 matches the received first NFC ID to the player account record, in method step 448, the system 10 displays a second indicator 268 on the NFC device 120 (as shown in FIGS. 22 and 25). The second indicator 268 displays a successful log-in to the gaming device 12 by the first unique NFC ID 264. After the application processor 102 receives a successful log-in, the player tracking data associated with the first player tracking number 266 will be sent to the gaming machine 12. In method step 450, the system 10 displays a third indicator 276 on the NFC device (as shown in FIGS. 23 and 26). The third indicator 276 indicates when the player is not successfully logged-into the gaming machine or in response to the termination of access to the player account record. The predetermined proximity is a specific distance between the NFC reader and the NFC component 25, also known as the response range 218. For example, the response range 218 may be 2-4 cm between the NFC component 25 and the NFC reader. If the NFC reader 120 receives a bad read of the NFC component 25, the NFC reader light 162 may display a red color. If the system 10 does not receive the NFC component 25 within the predetermined proximity, the system 10 will continue to display the first indicator 260 on the NFC reader 120.

Figure 21:
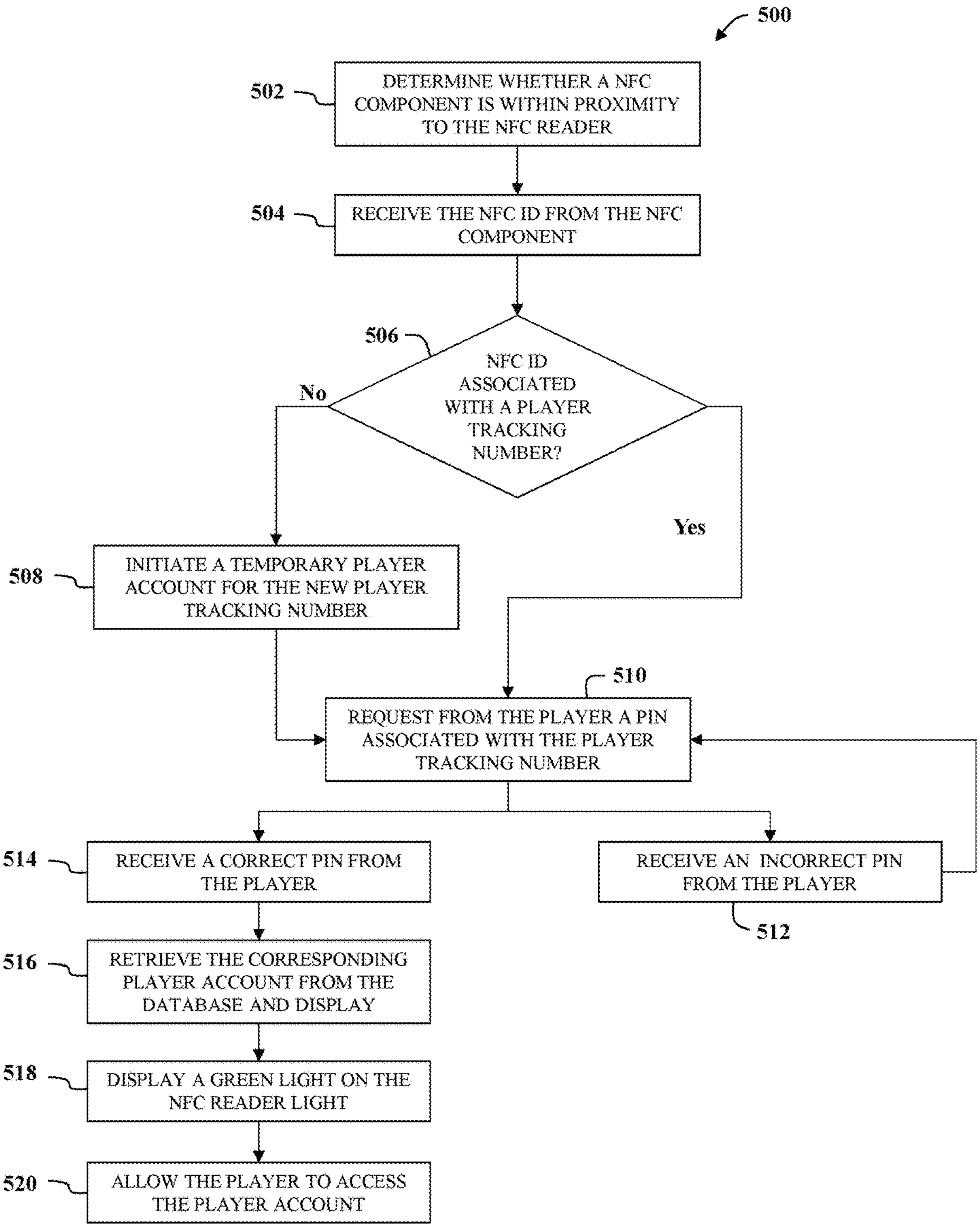

The method 500 includes a plurality of steps, as shown in FIG. 21. Each method step may be performed independently of, or in combination with, other method steps. Portions of the method 500 may be performed by any one of, or any combination of, the components of the system 10.

In method step 502, the system 10 determines whether the NFC component 78 of the mobile computing device 24 (or NFC enabled card) is within proximity to the NFC reader 120 of the EGM 28. If the NFC reader 120 receives a bad read of the NFC component 78, the NFC reader light 166 may display a red color.

In method step 504, the system 10 receives the player tracking ID 198/198 from the NFC component 78 (from the mobile computing device 24 or the NFC enabled card).

In method step 506, the system 10 determines whether the database includes a corresponding player account 220 with the player tracking ID 196. If the player tracking ID 198 does not include a corresponding player account 220, in method step 508, the system 10 may initiate a temporary player account 232 for the new player tracking ID 198. In method step 510, the system 10 may request from the player a PIN 226/238 associated with the player tracking ID 196/198 to allow the player to access the player tracking account 220/232. In method step 512, the system 10 receives an incorrect PIN from the player forcing method step 510 to repeat until the system 10 receives a correct PIN.

In method step 514, the system 10 receives a correct PIN 226/238 and in method step 516, retrieves the corresponding player account 220/232 from the database 46 to display on the player gaming device 12. In addition, in method step 518, once the correct PIN is received the NFC reader light may light up green indicating a good tap-in of the NFC component 78. In method step 520, the system 10 allows the player tracking ID and corresponding player access to the player account.

The system 10 allows the player to retrieve a plurality of information from the player tracking account for the player's use by tapping in and out of the NFC reader 120. The system 10 allows the temporary player to access the information collected from the previous play by setting up a new PIN for the temporary player tracking account creating a new player account.

In addition, the system 10 may use a SYNKROS club form to send the NFC ID to the mobile computing device 24 to save the player tracking information. This allows the system 10 to not use a $4,000 NFC printer. In addition, by using the SYNKROS club form, a pre-print NFC label (NFC tag 26) may be used by attaching the NFC tag 26 to the outside of the mobile computing device 24 and/or player mag stripe cards. This allows the system 10 to use all mobile computing devices 24 and a player tracking card for NFC player tracking.

Obviously, many modifications and variations of the present invention are possible in light of the above teachings. The invention may be practiced otherwise than as specifically described within the scope of the appended claims.

Exemplary embodiments of a system and method for providing gaming property services to a patron are described above in detail. The system and method are not limited to the specific embodiments described herein, but rather, components of the system and/or steps of the method may be utilized independently and separately from other components and/or steps described herein. For example, the system may also be used in combination with other wagering systems and methods, and is not limited to practice with only the system as described herein. Rather, an exemplary embodiment can be implemented and utilized in connection with many other monitoring applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor. Processors may execute one or more program applications, such as a web browser (e.g., Microsoft Internet Explorer, Mozilla Firefox, Apple Safari, Google Chrome, and Opera, etc.), to access and view content over a computer network. In particular implementations, the program applications allow a user to enter addresses of specific network resources to be retrieved, such as resources hosted by a networking system. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page. A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DBx, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In some embodiments, a network, as describe herein, includes a network addressable system that, in various example embodiments, comprises one or more physical servers and data stores. The one or more physical servers are operably connected to a computer network via, by way of example, a set of routers and/or networking switches. In an example embodiment, the functionality hosted by the one or more physical servers may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like. Data stores may store content and data relating to, and enabling, operation of the networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Data stores corresponds to one or more of a variety of separate and integrated databases, such as relational databases and object-oriented databases, that maintain information as an integrated collection of logically related records or files stored on one or more physical systems.

For example, the processes described herein may be implemented using hardware components, software components, and/or any combination thereof. By way of example, while embodiments of the present disclosure have been described as operating in connection with a networking website, various embodiments of the present invention can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A networked computer system, comprising:

a near field communication (NFC) reader coupled to a gaming device and configured to receive NFC signals from an NFC component associated with a user; and a player tracking server computer coupled in communication with the NFC reader, the player tracking server computer including a processor programmed to execute an algorithm including:

receiving an NFC signal from the NFC component via the NFC reader, the received NFC signal including a user ID;

accessing a plurality of user account records and selecting a matching user account record having a corresponding user ID matching the received user ID;

retrieving account information included in the matching user account record; and displaying the account information on the gaming device.

2. The networked computer system of claim 1, wherein the processor is programmed to execute the algorithm including:

creating a temporary anonymous user account record upon determining the plurality of user account records does not include a matching user account record;

monitoring gaming activity associated with the gaming device; and modifying the temporary anonymous user account record to include the monitored gaming activity.

3. The networked computer system of claim 2, wherein the processor is programmed to execute the algorithm including:

converting the temporary anonymous user account record to a known user account record upon receiving a second NFC signal including a second user ID associated with a casino employee.

4. The networked computer system of claim 1, wherein the processor is programmed to execute the algorithm including:

receiving the NFC signal including an electronic funds transfer (EFT) request;

displaying a prompt on the gaming device requesting the user to enter a personal identification number (PIN); and executing the EFT request upon verifying the received user PIN matches a PIN associated with the matching user account record.

5. The networked computer system of claim 1, wherein the processor is programmed to execute the algorithm including:

receiving the NFC signal including a gaming credit transfer request;

displaying a prompt on the gaming device requesting the user to enter a personal identification number (PIN); and transferring gaming credits to a credit meter of the gaming device upon verifying the user entered PIN matches a PIN associated with the matching user account record.

6. The networked computer system of claim 1, wherein the processor is programmed to execute the algorithm including:

initiating a gaming session to monitor gaming activity associated with the gaming device; and modifying the matching user account record to include information associated with the monitored gaming activity.

7. The networked computer system of claim 1, wherein the processor is programmed to execute the algorithm including:

receiving a signal from the corresponding gaming device indicating a bonus award;

transmitting a request to a mobile device associated with a casino employee indicating the bonus award;

receiving a second NFC signal from the corresponding NFC reader including a second user ID associated with the casino employee; and upon verifying an employee user account record associated with the second user ID, modifying the matching user account record to include the bonus award.

8. A method of operating a networked computer system including a near field communication (NFC) reader coupled to a gaming device and a player tracking server computer including one or more processors coupled in communication with the NFC reader, the method including the one or more processors performing an algorithm including the steps of:

receiving an NFC signal from the NFC component via the NFC reader, the received NFC signal including a user ID;

accessing a plurality of user account records and selecting a matching user account record having a corresponding user ID matching the received user ID;

retrieving account information included in the matching user account record; and displaying the account information on the gaming device.

9. The method of claim 8, including the one or more processors performing the algorithm including the steps of:

creating a temporary anonymous user account record upon determining the plurality of user account records does not include a matching user account record;

monitoring gaming activity associated with the gaming device; and modifying the temporary anonymous user account record to include the monitored gaming activity.

10. The method of claim 9, including the one or more processors performing the algorithm including the steps of:

converting the temporary anonymous user account record to a known user account record upon receiving a second NFC signal including a second user ID associated with a casino employee.

11. The method of claim 8, including the one or more processors performing the algorithm including the steps of:

receiving the NFC signal including an electronic funds transfer (EFT) request;

displaying a prompt on the gaming device requesting the user to enter a personal identification number (PIN); and executing the EFT request upon verifying the received user PIN matches a PIN associated with the matching user account record.

12. The method of claim 8, including the one or more processors performing the algorithm including the steps of:

receiving the NFC signal including a gaming credit transfer request;

displaying a prompt on the gaming device requesting the user to enter a personal identification number (PIN); and transferring gaming credits to a credit meter of the gaming device upon verifying the user entered PIN matches a PIN associated with the matching user account record.

13. The method of claim 8, including the one or more processors performing the algorithm including the steps of:

initiating a gaming session to monitor gaming activity associated with the gaming device; and modifying the matching user account record to include information associated with the monitored gaming activity.

14. The method of claim 8, including the one or more processors performing the algorithm including the steps of:

receiving a signal from the corresponding gaming device indicating a bonus award;

transmitting a request to a mobile device associated with a casino employee indicating the bonus award;

receiving a second NFC signal from the corresponding NFC reader including a second user ID associated with the casino employee; and upon verifying an employee user account record associated with the second user ID, modifying the matching user account record to include the bonus award.

15. A non-transitory computer-readable storage media having computer-executable instructions embodied thereon to operate a networked computer system including a near field communication (NFC) reader coupled to a gaming device and a player tracking server computer including one or more processors coupled in communication with the NFC reader, when executed by the one or more processors the computer-executable instructions cause the one or more processors to perform an algorithm including the steps of:

receiving an NFC signal from the NFC component via the NFC reader, the received NFC signal including a user ID;

accessing a plurality of user account records and selecting a matching user account record having a corresponding user ID matching the received user ID;

retrieving account information included in the matching user account record; and displaying the account information on the gaming device.

16. The non-transitory computer-readable storage media of claim 15, wherein the computer-executable instructions cause the one or more processors to perform the algorithm including the steps of:

creating a temporary anonymous user account record upon determining the plurality of user account records does not include a matching user account record;

monitoring gaming activity associated with the gaming device; and modifying the temporary anonymous user account record to include the monitored gaming activity.

17. The non-transitory computer-readable storage media of claim 16, wherein the computer-executable instructions cause the one or more processors to perform the algorithm including the steps of:

converting the temporary anonymous user account record to a known user account record upon receiving a second NFC signal including a second user ID associated with a casino employee.

18. The non-transitory computer-readable storage media of claim 15, wherein the computer-executable instructions cause the one or more processors to perform the algorithm including the steps of:

receiving the NFC signal including an electronic funds transfer (EFT) request;

displaying a prompt on the gaming device requesting the user to enter a personal identification number (PIN); and executing the EFT request upon verifying the received user PIN matches a PIN associated with the matching user account record.

19. The non-transitory computer-readable storage media of claim 15, wherein the computer-executable instructions cause the one or more processors to perform the algorithm including the steps of:

receiving the NFC signal including a gaming credit transfer request;

displaying a prompt on the gaming device requesting the user to enter a personal identification number (PIN); and transferring gaming credits to a credit meter of the gaming device upon verifying the user entered PIN matches a PIN associated with the matching user account record.

20. The non-transitory computer-readable storage media of claim 15, wherein the computer-executable instructions cause the one or more processors to perform the algorithm including the steps of:

receiving a signal from the corresponding gaming device indicating a bonus award;

transmitting a request to a mobile device associated with a casino employee indicating the bonus award;

receiving a second NFC signal from the corresponding NFC reader including a second user ID associated with the casino employee; and upon verifying an employee user account record associated with the second user ID, modifying the matching user account record to include the bonus award.

* * * * *